United States Patent
Izawa et al.

(10) Patent No.: US 7,533,199 B2
(45) Date of Patent: May 12, 2009

(54) AUTOMATIC TRANSACTION APPARATUS, AUTOMATIC TRANSACTION CONTROL METHOD, AND CONTROL PROGRAM THEREOF

(75) Inventors: Shuichi Izawa, Maebashi (JP); Satoshi Tomi, Inagi (JP); Kouji Yamamoto, Maebashi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 285 days.

(21) Appl. No.: 10/830,150

(22) Filed: Apr. 23, 2004

(65) Prior Publication Data
US 2005/0109832 A1    May 26, 2005

(30) Foreign Application Priority Data
Nov. 20, 2003    (JP) .............................. 2003-390475

(51) Int. Cl.
  *G06F 13/00* (2006.01)
  *G06F 13/12* (2006.01)
  *G06Q 40/00* (2006.01)
(52) U.S. Cl. ............................. 710/33; 710/62; 710/72; 705/35; 705/43
(58) Field of Classification Search ................... 710/33, 710/62, 72; 705/35, 43
See application file for complete search history.

(56) References Cited

U.S. PATENT DOCUMENTS

| | | | | |
|---|---|---|---|---|
| 5,995,972 | A * | 11/1999 | Allgeier | 707/103 R |
| 6,868,448 | B1 * | 3/2005 | Gupta et al. | 709/226 |
| 6,928,420 | B1 * | 8/2005 | Kurihara et al. | 705/64 |
| 7,024,668 | B2 * | 4/2006 | Shiomi et al. | 718/1 |
| 2004/0131082 | A1 * | 7/2004 | Evans et al. | 370/469 |
| 2005/0108164 | A1 * | 5/2005 | Salafia et al. | 705/42 |
| 2008/0235124 | A1 * | 9/2008 | Bryant et al. | 705/35 |

FOREIGN PATENT DOCUMENTS

| | | |
|---|---|---|
| JP | 3-116354 | 5/1991 |
| JP | 3-225555 | 10/1991 |
| JP | 2000-225754 | 8/2000 |
| JP | 2002-278712 | 9/2002 |

* cited by examiner

*Primary Examiner*—Alford W Kindred
*Assistant Examiner*—David E Martinez
(74) *Attorney, Agent, or Firm*—Staas & Halsey LLP

(57) ABSTRACT

An automatic transaction apparatus operates an automatic transaction unit using middleware whose environment is set by a kernel, which uses conventional middleware even if the interface with the host is standardized. The parameters specific to the vender of the apparatus are set in the parameter file in advance, the I/O control layer edits the parameters of the commands of a common interface (API) and the vender specific parameters of the parameter file, converts the result into the commands of the ATM middle API, sends them to the ATM middleware, and operates the vender specific I/O units.

20 Claims, 31 Drawing Sheets

FIG. 4

| COMMAND TYPE | COMMAND |
|---|---|
| CRW COMMAND | CARD INSERTION |
| | CARD EJECT |
| RPR COMMAND | PRINT |
| | RELEASE |
| PPR COMMAND | PASSBOOK INSERTION |
| | PRINT |
| | MS WRITE |
| | PASSBOOK EJECT |
| | AUTO TURN PAGE |
| BRU COMMAND (CRU COMMAND) | INITIALIZATION |
| | ACCEPTANCE/COUNTING |
| | STORE |
| | DEPOSIT RETURN |
| | FEED |
| | RELEASE |
| | CAPTURE |
| | TRANSPORT PATH CHECK |
| | JAM RESET |

FIG. 10

| ITEM | PROCESS | COMMON INTERFACE | VENDOR SPECIFIC INTERFACE |
|---|---|---|---|
| 1 | UNIT INITIALIZE PROCESS | | PASSBOOK PRINTER USER TYPE CODE |
| 2 | | | PASSBOOK RIBBON NEAR END CHECK SPECIFICATION |
| 3 | | | PASSBOOK MS WRITE ERROR PAUSE SPECIFICATION |
| 4 | | | PASSBOOK PAGE MARK UP/DOWN USE SPECIFICATION |
| 5 | | | FORGOTTON PASSBOOK TAKE-IN/CLOSE SPECIFICATION |
| 6 | PASSBOOK INSERT PROCESS | INSERT MEDIUM LOGICAL TYPE SPECIFICATION | |
| 7 | | PASSBOOK TYPE NO. SPECIFICATION | |
| 8 | | W-MS CHANGE SPECIFICATION | |
| 9 | | STRIPE POSITION SPECIFICATION | |
| 10 | | MS ERASE SPECIFICATION | |
| 11 | | SPECIFIED LINE POSITION SPECIFICATION | |
| 12 | | COMPOSIT OPERATION SPECIFICATION | |
| 13 | | CAMERA CONTROL SPECIFICATION | |
| 14 | | | MS POSITION |
| 15 | | | MS FORMAT |
| 16 | | | MS PARAMETER |
| 17 | | | LINE LAMP CONTROL DESIGNATION |

FIG. 13

| | |
|---|---|
| INITIALIZE | SPECIFY BASIC PARAMETER NECESSARY TO OPERATION OF INITIALIZE PROCESS IN CRW CLIENT |
| EJECT | SPECIFY NECESSARY PARAMETER WHEN EJECTING MEDIUM |
| CARD INSERT | SPECIFY NECESSARY PARAMETER WHEN INSERTING MEDIUM |
| MS WRITE | SPECIFY NECESSARY PARAMETER WHEN WRITING MAGNETIC DATA ON CARD MAGNETIC STRIPE |
| FORCED EJECT | SPECIFY NECESSARY PARAMETER WHEN FORCE-EJECTING MEDIUM |
| ISSUE | SPECIFY NECESSARY PARAMETER WHEN ISSUEING BANK TRANSFER CARD |

FIG. 16

| | |
|---|---|
| INITIALIZE | SPECIFY BASIC PARAMETER NECESSARY TO OPERATION OF INITIALIZE PROCESS IN BRU CLENT |
| BILL RECEIPT | SPECIFY NECESSARY PARAMETER WHEN WAITING INSERTION OF BILL |
| BILL COUNT | SPECIFY NECESSARY PARAMETER WHEN COUNTING/VALIDATING BILL |
| BILL RECEIPT/COUNT | SPECIFY NECESSARY PARAMETER WHEN WAITING INSERTION AND COUNTING BILL |
| BILL FEED | SPECIFY NECESSARY PARAMETER WHEN FEEDING, VALIDATING (COUNTING), STRONG BILL |
| BILL RELEASE | SPECIFY NECESSARY PARAMETER FOR RELEASE BILL AND SHUTTER CONTROL |
| CHECK TRANSPORT PATH | SPECIFY NECESSARY PARAMETER WHEN CHECKING RESIDUAL BILL ON BRU TRANSPORT PATH |
| RESET JAM | SPECIFY NECESSARY PARAMETER WHEN COLLECTING JAMMED BILL ON BRU TRANSPORT PATH |

FIG. 25

| INITIALIZE | SPECIFY BASIC PARAMETER NECESSARY TO OPERATION OF INITIALIZE PROCESS IN PPR CLIENT |
|---|---|
| EJECT | SPECIFY NECESSARY PARAMETER WHEN EJECTING MEDIUM |
| PASSBOOK INSERT | SPECIFY NECESSARY PARAMETER WHEN INSERTING MEDIUM |
| FORCED EJECT | SPECIFY NECESSARY PARAMETER WHEN FORCE EJECTING MEDIUM |
| ISSUE | SPECIFY NECESSARY PARAMETER WHEN ISSUEING PASSBOOK/CUT FORM |

FIG. 26

| INITIALIZE | SPECIFY BASIC PARAMETER NECESSARY TO OPERATION OF INITIALIZE PROCESS IN RPR CLIENT |
|---|---|
| RECEIPT EJECT | SPECIFY NECESSARY PARAMETER WHEN EJECTING RECEIPT |

FIG. 27

| INITIALIZE | SPECIFY BASIC PARAMETER NECESSARY TO OPERATION OF INITIALIZE PROCESS IN JPR CLIENT |
|---|---|

AUTOMATIC TRANSACTION APPARATUS, AUTOMATIC TRANSACTION CONTROL METHOD, AND CONTROL PROGRAM THEREOF

CROSS-REFERENCE TO RELATED APPLICATIONS

This application is based upon and claims the benefit of priority from the prior Japanese Patent Application No. 2003-390475, filed on Nov. 20, 2003, the entire contents of which are incorporated herein by reference.

BACKGROUND OF THE INVENTION

1. Field of the Invention

The present invention relates to an automatic transaction apparatus and automatic transaction control method for performing automatic transaction operations according to commands from a host, and a control program thereof, and more particularly to an automatic transaction apparatus and automatic transaction control method for enabling the automatic transaction operation of models with different specifications using an interface common with the host, and a control program thereof.

2. Description of the Related Art

Automatic transaction apparatus are used for various transactions, and in the financial field, for example, automatic withdrawal machines and automatic deposit/withdrawal machines are used, and in other fields, automatic ticket machines and automatic issuing machines are used.

Such an automatic transaction apparatus is normally connected to a host, and deposits/withdrawals, issues tickets and outputs various information using a host database. FIG. 37 is a block diagram of a conventional automatic transaction system, and shows an ATM (Automatic Teller Machine) for financial operations.

As FIG. 37 shows, the host (server) 300 and the automatic cash transaction apparatus 400 are connected via a network. The host 300 has an ATM application layer and a service server for controlling the automatic transaction apparatus (ATM) 400, and controls the ATM 400 using the service server and the ATM application layer.

In the ATM 400, on the other hand, the ATM middleware 410 and the device driver 430 operate under the control of the kernel (OS) 420, and I/O operations (transaction operations) are performed. The ATM 400 comprises a card reader/writer unit 440, receipt/journal printer 441, bill/coin processing unit 442, passbook processing unit 443 and the customer operation panel 444 as the I/O mechanism units.

The ATM middleware 410 is an application program for controlling each of the above mentioned I/O units according to instructions from the host 300, and is comprised of a state layer 412 for interfacing with the host, an I/O client layer 414 for controlling an individual I/O unit, an I/O server layer 416 for starting and ending an I/O operation and controlling the communication protocol, and the I/O service provider layer 418 for converting messages with each I/O unit.

This ATM middleware 410 is for generating commands and data for operating each I/O unit according to the instructions from the host 300. Because of this, the ATM middleware 410 is designed according to a specific interface with the host 300, the configuration of each I/O unit 440-444, and vender specific information of the apparatus.

On the other hand, it has been proposed to change the individual setup information of the automatic transaction apparatus, such as the financial institution number where the apparatus is installed, the branch number, the host line type and the line speed, via the WEB, using such a protocol as TCP/IP for example (e.g. Japanese Patent Application Laid-Open No. 2002-260068).

In this proposal, fixed setup information, depending on the OS and application of the automatic transaction apparatus, can be continuously used for a changed OS and application, enabling and guaranteeing compatibility between different apparatus.

Recently because of demands for an open system, and because of mergers and the integration of the users of financial institutions, there is the desire to operate multi-model multi-vender automatic transaction apparatus with the same ATM applications (architecture).

In the case of a conventional automatic transaction apparatus, a same ATM middleware 410 can be used if the model and the functional range of the automatic transaction apparatus are the same, and if the specifications of I/O units are the same as well. However, a same ATM middleware cannot be used if the model and the functional range of the automatic transaction apparatus and the specifications of the I/O units are different.

For this reason, in order to operate the automatic transaction apparatus for which the model, functional range and specifications of I/O units are different, with the same ATM applications using a common interface, the ATM middleware 410 of an individual automatic transaction apparatus must be designed accordingly.

Therefore a conventional ATM middleware (asset) cannot be used, and the spread of systems for operating multi-model multi-vender automatic transaction apparatus is being interrupted. In particular this is the case of increasing the burden of integrating systems when the users of financial institutions merge.

SUMMARY OF THE INVENTION

With the foregoing in view, it is an object of the present invention to provide an automatic transaction apparatus and an automatic transaction method for operating with a common interface using a conventional middleware asset and a control program thereof.

It is another object of the present invention to provide an automatic transaction apparatus and an automatic transaction control method for easily customizing a conventional middleware asset according to the architecture, and a control program thereof.

It is still another object of the present invention to provide an automatic transaction apparatus and an automatic transaction control method for increasing the number of models that operate with a common interface by using a conventional middleware asset, and a control program thereof.

To achieve these objects, the automatic transaction apparatus of the present invention is an automatic transaction apparatus for communicating with a host and performing transaction operations according to the operation of the customer, having a plurality of I/O units for performing the transaction operations and a control unit for controlling the I/O unit according to transaction control signals from the host. And the control unit has a middleware layer for operating under the control of a kernel and controlling the I/O units, a parameter file which stores parameters for converting transaction control signals specified by an interface with the host into transaction control signals specific to the middleware layer, and an I/O control layer for converting the transaction control signals specified by the interface with the host into the transaction control signals specific to the middleware, referring to the parameter file, and operating the middleware layer.

The automatic transaction control method of the present invention is an automatic transaction control method of an automatic transaction apparatus for communicating with a host and performing transaction operations according to the operation of a customer, having steps of: receiving transaction control signals specified by an interface with the host; controlling a plurality of I/O units for performing the transaction operations using a middleware layer based on the transaction control signals; and referring to a parameter file which stores parameters for converting the transaction control signals specified by the interface with the host into transaction control signals specific to the middleware, converting the transaction control signals sent from the host into the transaction control signals specific to the middleware layer, and operating the middleware layer.

The control program of the present invention is a control program of an automatic transaction apparatus for communicating with a host and performing transaction operations according to the operation of a customer, for having the automatic transaction apparatus perform steps of: receiving transaction control signals specified by an interface with said host; and referring to a parameter file which stores parameters for converting the transaction control signals specified by the interface with the host into the transaction control signals specific to the middleware for controlling a plurality of I/O units for performing the transaction operation, converting the transaction control signals sent from the host into the transaction control signals specific to the middleware layer, and operating the middleware layer.

In the present invention, it is preferable that the I/O control layer has a plurality of I/O control libraries corresponding to each of the plurality of I/O units, calls up the I/O control library according to the transaction control signals sent from the host, reads the parameters corresponding to the I/O control library from the parameter file, edits the transaction control signal to the transaction control signals specific to the middleware layer using the parameter, and operates the middleware layer.

In the present invention, it is preferable that the middleware layer has an I/O client layer for intermediating the transaction control signals sent to the I/O unit, an I/O server layer for starting and ending the I/O operation and controlling the communication protocol by the transaction control signals of the I/O client layer, and an I/O service provider layer for converting messages with each of the I/O units.

In the present invention, it is preferable that the plurality of I/O units is a plurality of I/O units that perform cash transactions based on the operation of the customer.

In the present invention, it is preferable that the I/O control layer receives the transaction control signals from the host that follows the cash transaction sequence specified by the customer, operates the I/O unit, and returns it to the host.

In the present invention, it is preferable that the control unit has a browser for communicating with the host on the WEB, and exchanging the control signals specified by the interface between the I/O control layer and the host.

In the present invention, it is preferable that the I/O control layer logicalizes the reply from the I/O unit, and relays it to the host.

In the present invention, it is preferable that the I/O unit is an I/O unit which handles a medium, and the I/O control layer logicalizes the reply regarding the medium from the I/O unit, and replies it to the host.

According to the present invention, the vender specific parameters of the apparatus are set in advance, the I/O control layer edits the parameters of the commands of a common interface (API) and the vender specific parameters of the parameter file, converts the result into the commands of the ATM middle API, sends them to the ATM middleware, and operates the vender specific I/O unit, so the vender specific I/O unit can be operated by the commands of the common interface (API).

In other words, a conventional ATM middleware can be customized so as to operate with a standard interface.

BRIEF DESCRIPTION OF THE DRAWINGS

FIG. 4 is a table showing the transaction commands of the common interface in FIG. 3;

FIG. 10 is a table showing a common interface and a vender specific interface according to an embodiment of the present invention;

FIG. 13 is a table showing the vender specific parameters of the card (CRW) unit command;

FIG. 16 is a table showing the vender specific parameters of the bill (BRU) unit command;

FIG. 25 is a table showing the vender specific parameters of the passbook (PPR) unit command;

FIG. 26 is a table showing the vender specific parameters of the receipt printer (RPR) unit command;

FIG. 27 is a table showing the vender specific parameters of the journal printer (JPR) unit command;

DESCRIPTION OF THE PREFERRED EMBODIMENTS

Embodiments of the present invention will now be described in the sequence of automatic transaction system, common API, customization method for conventional ATM middleware, configuration of I/O control layer, logicalization method for specific output and other embodiments.

[Automatic Transaction System]

Figure 1:
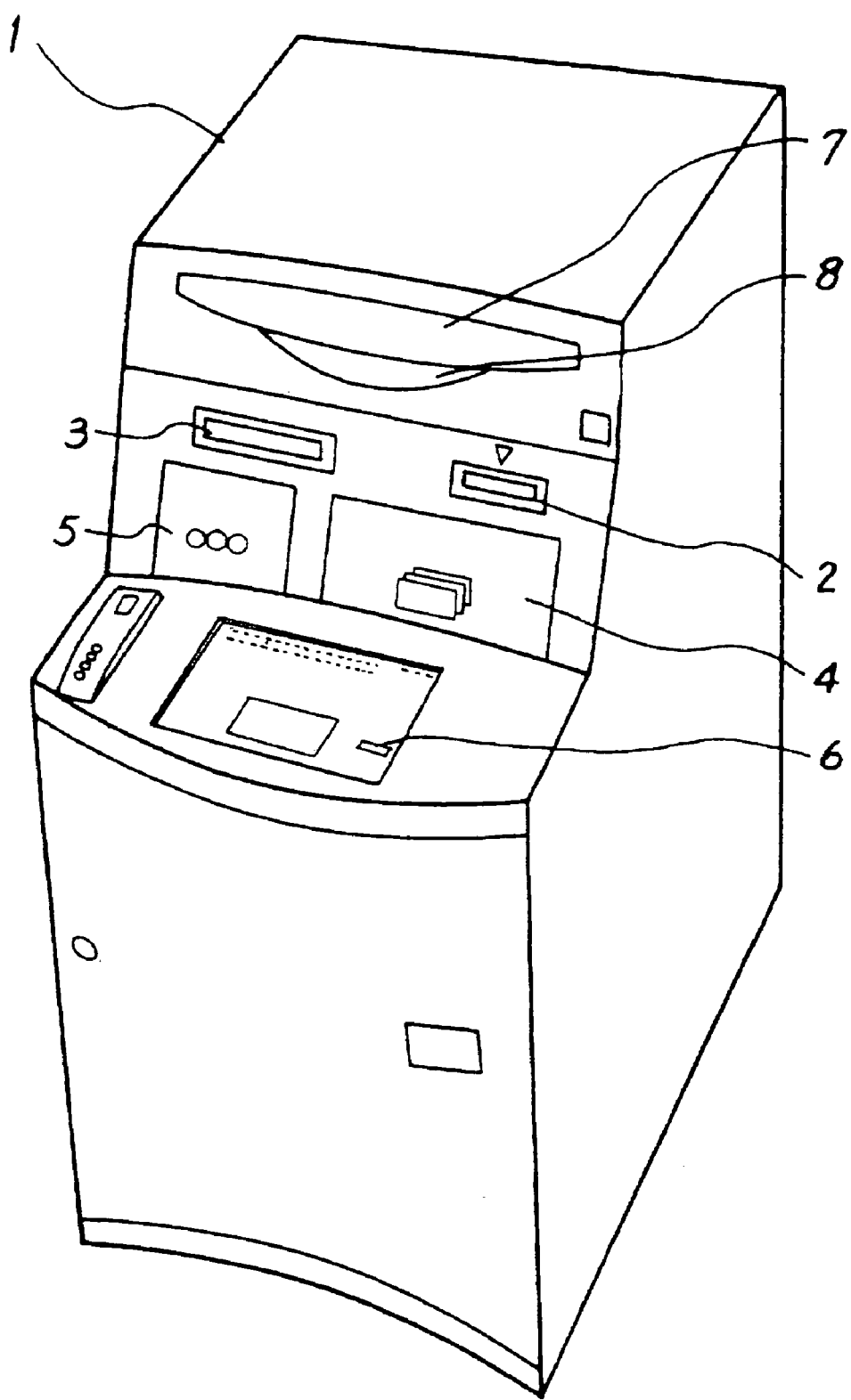
FIG. 1 is an external view depicting an automatic transaction apparatus according to an embodiment of the present invention.
Figure 2:
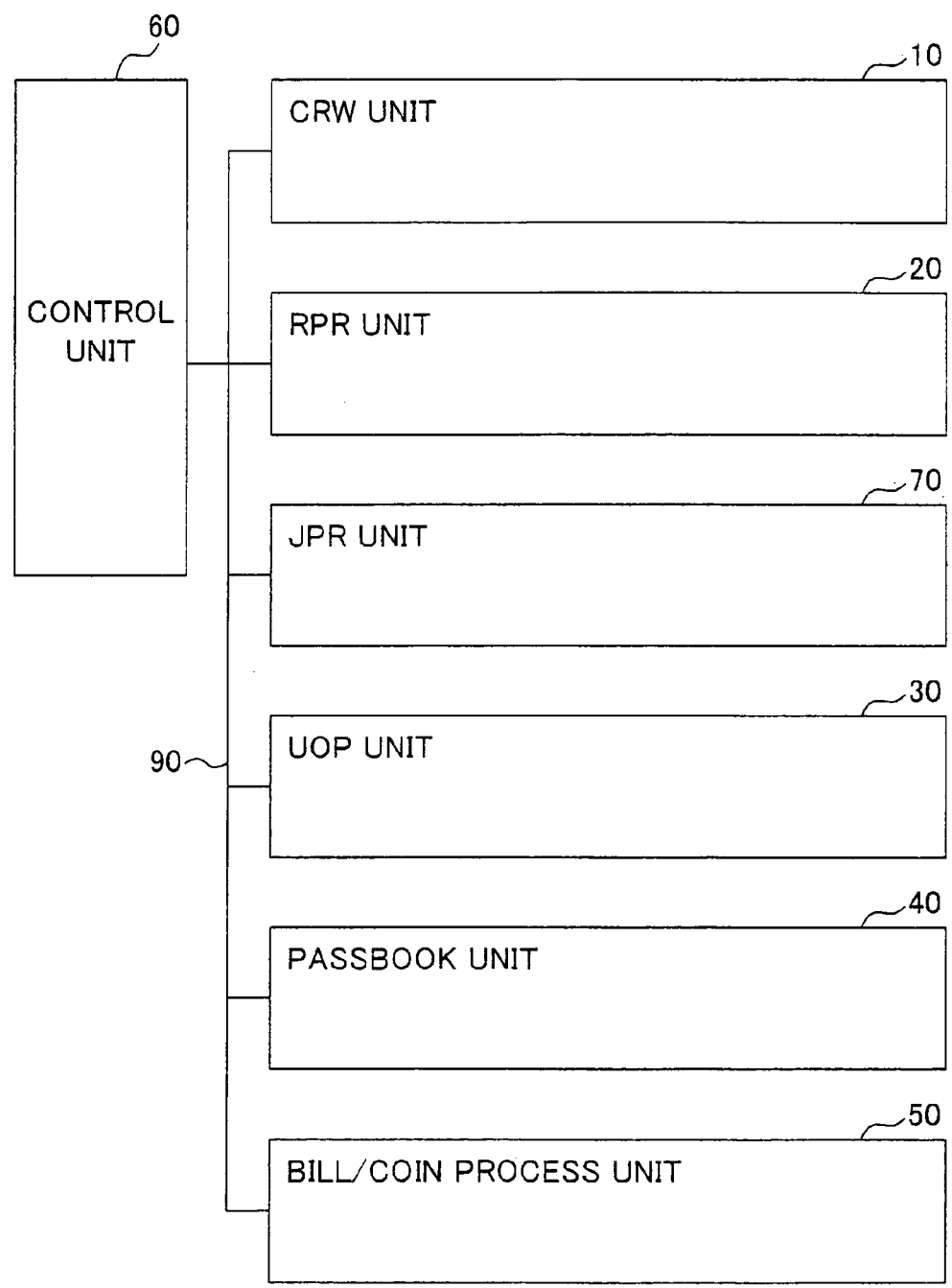
FIG. 2 is a block diagram depicting the automatic transaction apparatus in FIG. 1.
Figure 3:
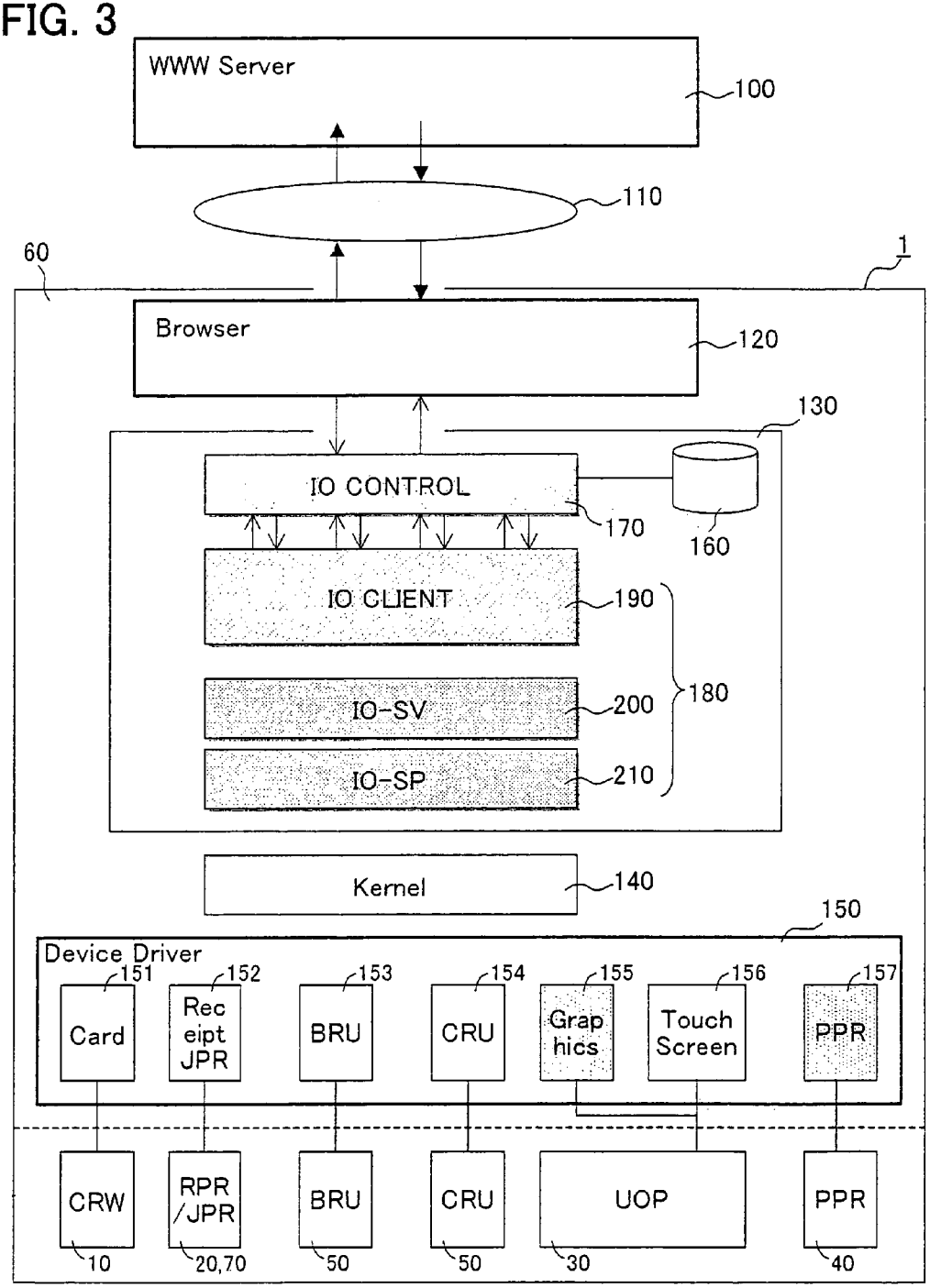
FIG. 3 is a system block diagram depicting an automatic transaction system according to an embodiment of the present invention.

FIG. 1 shows an external view of an automatic transaction apparatus according to an embodiment of the present invention, FIG. 2 is a block diagram depicting the automatic transaction apparatus in FIG. 1, and FIG. 3 is a system block diagram depicting the automatic transaction system according to an embodiment of the present invention.

As FIG. 1 shows, the automatic transaction apparatus 1 has a card entry 2 for inserting and ejecting a magnetic card, a passbook entry 3 for inserting and ejecting a magnetic passbook, a bill entry 4 for entering and ejecting bills, a coin entry 5 for entering and ejecting coins, UOP (User Operation Panel) 6 for a user to operate, an operation display 7 for displaying the operation status to the user, and a customer sensor 8 for detecting the user.

FIG. 2 is a block diagram depicting the automatic transaction apparatus 1 in FIG. 1. The CRW (Card Reader Writer) unit 10 reads the magnetic card by the magnetic head and returns it to the entry 2 while transporting the magnetic card inserted from the card entry (card insertion slot) 2 using a transport mechanism, which is not illustrated. The CRW unit 10 has an image sensor so as to read the magnetic card (embossed section) optically.

The RPR (Receipt Printer) unit 20 prints the transaction result on the receipt paper by the print head, and ejects the receipt to the card entry 2. The RPR unit 20 stores the receipt returned from the entry 2 when the ejected receipt is not removed by the user within a predetermined time.

The JPR (Journal Printer) unit 70 prints out the transaction status and the result on the journal paper by the print head. The UOP unit 30 is comprised of the UOP (display with touch panel) 6 and the control circuit thereof. The passbook processing (PPR) unit 40 reads the magnetic passbook inserted from the passbook entry 3, prints the transaction on the magnetic passbook, and ejects the passbook from the passbook entry 3.

The bill/coin processing unit 50 performs deposit operation by validating the bills and coins entered through the bill entry 4 and the coin entry 5, counting them and storing them in stackers, and performs withdrawal operation for taking off the requested bills and coins from the cash stacker, and releasing them to the bill entry 4 and the coin entry 5. The control unit 60 is connected to these control units 10, 30, 40, 50, and 70 via such a network 90 as a LAN, and performs automatic transaction processing based on the software configuration, which is mentioned later in FIG. 3.

FIG. 3 is a block diagram of the automatic transaction system according to an embodiment of the present invention. The automatic transaction apparatus 1 exchanges commands, parameters and data required for the transaction processing with the WWW (World Wide Web) server (host) 100 via such a network 110 as the Internet.

In the automatic transaction apparatus 1, the abovementioned control unit 60 has the browser 120, ATM middleware 130, kernel (OS) 140 and device driver 150.

The device driver 150 is comprised of a card unit driver 151 for driving the card (CRW) unit 10, a receipt/journal unit driver 152 for driving the receipt/journal unit (RPR/JPR) 20 and 70, a BRU driver 153 for driving the BRU (bill) unit 50; a CRU driver 154 for driving the CRU (coin) unit 50, a graphic driver 155 and a touch screen driver 156 for driving the UOP 30, and PPR driver 157 for driving the passbook unit 40.

The browser 120, which is a Web browser, requests the Web server 100 to transmit content, and interprets and displays the content transmitted by the Web server 100. In this case, the browser 120 requests the content required for the transaction processing which is constructed by HTML and Java (registered trademark), interprets the transmitted content, and controls the ATM middleware 130 and the screen of the UOP 30.

The kernel 140 is a known OS (operating system) such as Windows (registered trademark) and Linux, and under the operating environment of the kernel 140, the browser 120, ATM middleware 130 and device driver 150 operate.

The ATM middleware 130 is comprised of a parameter file 160, I/O control layer 170, I/O client layer 190, I/O server layer 200 and I/O service processor layer 210.

This I/O client layer 190 is for controlling an individual I/O unit installed in the apparatus, where the I/O server layer 200 starts up and ends an I/O operation and controls the communication protocol, and the I/O service provider layer 210 converts the messages with each I/O unit. These are conventional middleware 180, which was designed according to the functional range and the type of the apparatus, and to the specifications of the connected I/O unit.

The I/O control layer 170, on the other hand, transmits/receives commands and data using the middleware common application interface protocol of the Web server 100. Since functional ranges are different each other, depending on the model of the apparatus, so the common application interface (API) is comprised of common commands and data systems that can operate all models, which will be described later in FIG. 4.

The I/O control layer 170 integrates the application interface (API) of the I/O client layer 190 and constructs a more abstract common API. The parameter file 160 is for storing the input parameters/fixed parameters which are uniquely determined by the system specifications specific to the vender (ATM manufacturer).

When the I/O control layer 170 calls up the I/O client layer 190, the I/O control layer 170 calls up the parameters specific to each I/O client layer from this parameter file 160, and converts a common API into a conventional client API.

By this, the highly abstract common API can be converted into a client API, matching the ATM middleware 190 of the automatic transaction apparatus 1 and the type of the installed I/O unit, and conventional ATM middleware 190 and the I/O units can be operated. In other words, a conventional ATM middleware can be customized so as to operate with a common API.

[Common API]

The common API will be described first. FIG. 4 shows an example of the command types of the common API. As CRW (Card Reader/Writer) commands, a card insertion command and a card eject command are provided.

As RPR (Receipt Printer) commands, a print command, release command and other commands are provided. As PPR (Passbook Printer) commands, a passbook insertion command, printing command, MS (Magnetic Stripe) write command, passbook ejection command, auto turn page command and other commands are provided.

As BRU (Bill Recycle Unit) commands, an initialization command, acceptance/counting command, storing command, deposit return command, feeding command, release command, capturing command, transport path check command, jam reset command and other commands are provided. The CRU (Coin Recycle Unit) commands are the same as the BRU commands, for which description is omitted.

Figure 5:
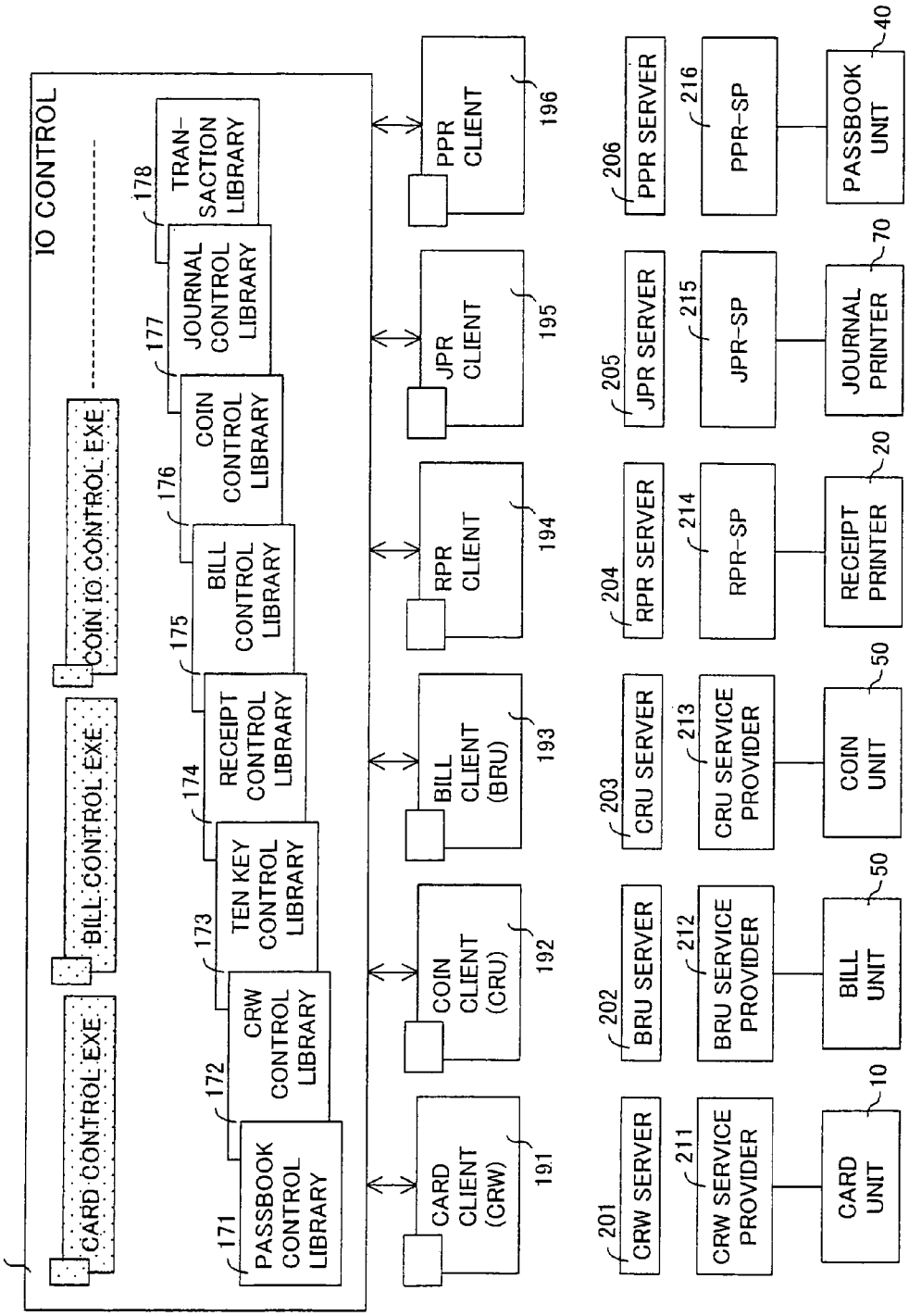
FIG. 5 is a block diagram depicting the ATM middleware in FIG. 3.

The configuration of the ATM middleware 130 will now be described with reference to FIG. 5. The I/O control layer 170 has the I/O control library group 171-178 for controlling each I/O. In this case, the I/O control library group is comprised of a passbook control library 171, CRW control library 172, ten-key control library 173, receipt control library 174, bill control library 175, coin control library 176, journal control library 177 and transaction control library 178.

These control libraries 171-178 are called up by a task (e.g. card control EXE) specified by the common API, and converts the task into the client API of conventional middleware using the above mentioned parameter table 160.

The I/O client layer 190 of the conventional middleware 180 is for controlling an individual I/O unit installed in the apparatus, and in this case, the card (CRW) client 191, coin client 192, bill client 193, RPR client 194, JPR client 195 and PPR client 196 are provided.

In the same way, the I/O server layer 200 is also divided into individual I/Os for starting and ending an individual I/O operation, and controlling the communication protocol. In other words, the card (CRW) server 201, coin server 203, bill server 202, RPR (Receipt Printer) server 204, JPR server 205 and PPR (Passbook Printer) server 206 are disposed.

In the same way, the I/O service provider layer 210 is also divided into individual I/Os for converting messages with each I/O unit. In other words, the card (CRW) service provider 211, coin service provider 213, bill service provider 212, RPR service provider 214, JPR service provider 215 and PPR service provider 216 are provided.

In other words, the control library, client, server and service provider which constitute the ATM middleware are provided corresponding to each I/O unit, and the I/O control 170 converts the requested commands and parameters of the common API into the commands and parameters of the conventional middleware API, and operates the I/O units via the conventional middleware.

Figure 6:
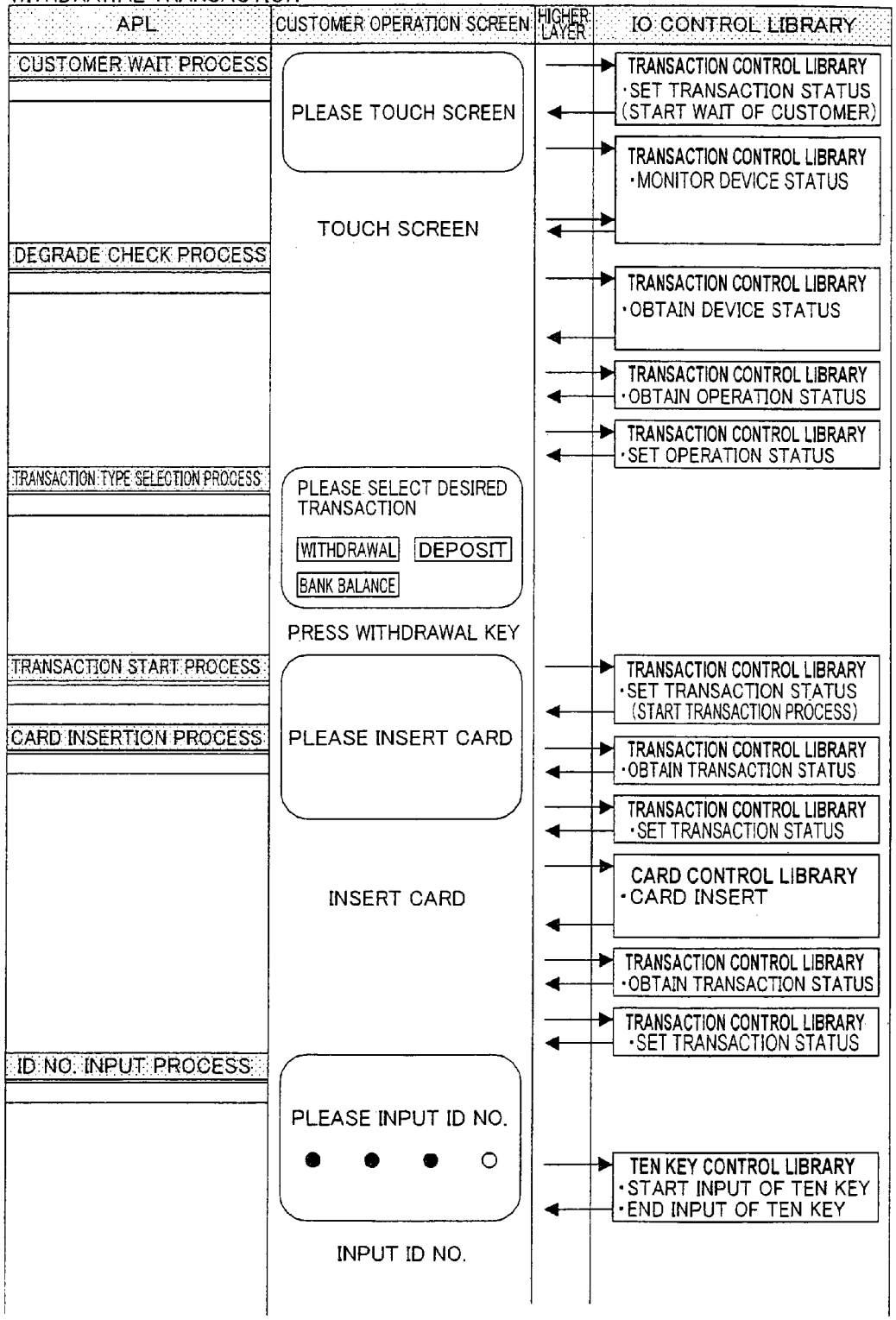
FIG. 6 is a flow chart (No. 1) depicting the automatic transaction control.
Figure 7:
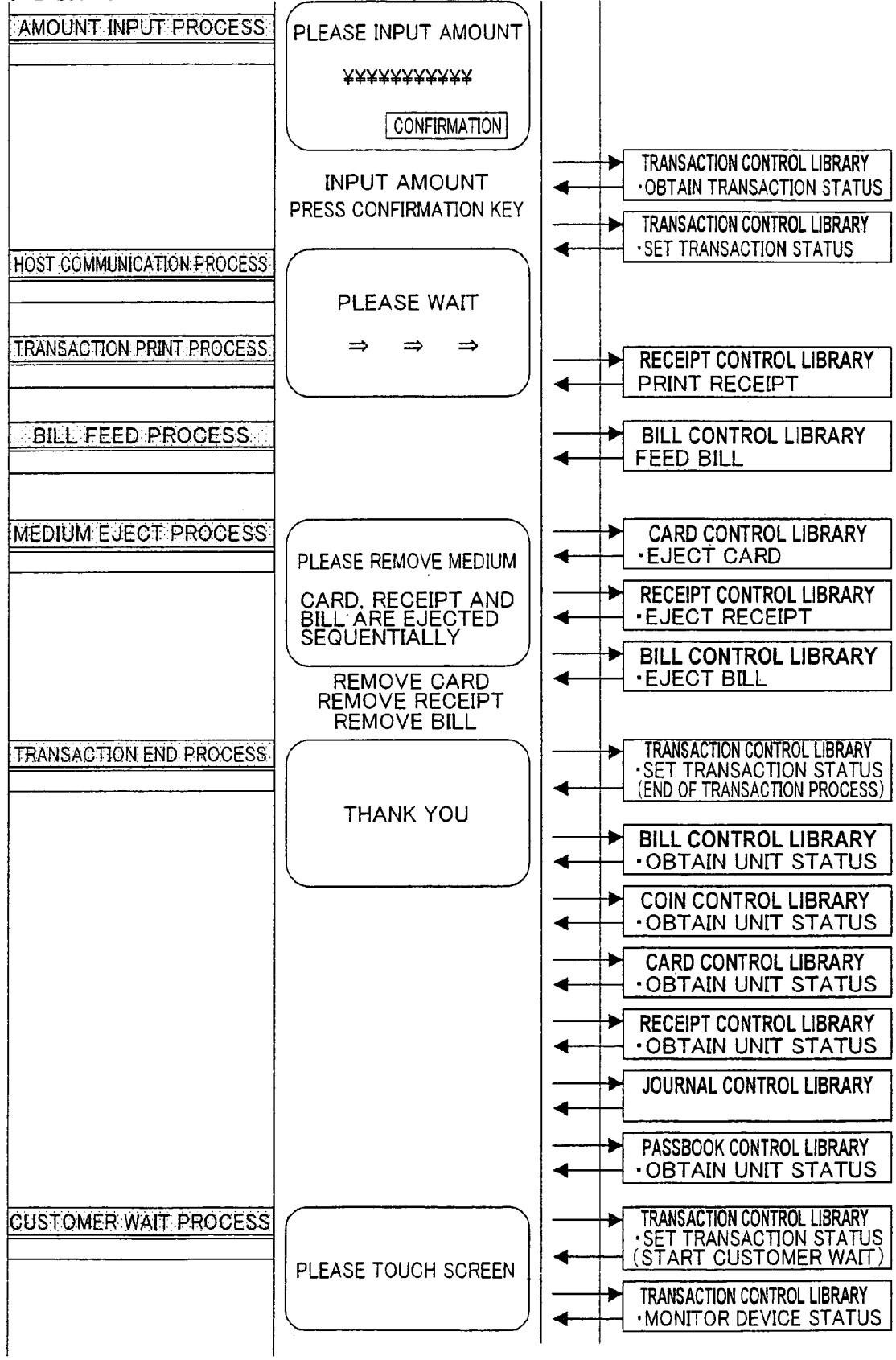
FIG. 7 is a flow chart (No. 2) depicting the automatic transaction control.

Now the relationship of the ATM application program (APL) of the server 100, customer operation screen (UOP screen), I/O control and I/O control library will be described using the withdrawal transaction in FIG. 6 and FIG. 7 as an example.

At the start of customer wait processing, the APL of the server 100 issues the transaction status setting command to the ATM 1. In the ATM 1, the I/O control 170 calls up the transaction control library 178 via a higher process (e.g. browser), sets the customer wait start status, and displays the customer wait status on the customer operation screen of the UOP 6. Hereafter the transaction control library 178 monitors the device status, detects the touch of the customer on the screen of the UOP 6, and reports this to the server 100.

Then the APL of the server 100 performs degradation check processing. In other words, the APL issues the degradation check command to the ATM 1. In the ATM 1, the I/O control 170 calls up the transaction control library 178 via a higher process (e.g. browser), acquires the device status (status of each I/O unit), then acquires the operation status (e.g. withdrawal only, deposit/withdrawal possible), sets the operation information, and reports this setting to the server 100.

The APL of the server 100 issues the transaction type select command and the screen to the ATM 1 according to the operation information setup by the transaction type select processing, and the ATM 1 displays this select screen on the customer operation screen of the UOP 6.

Since this is an example of the withdrawal transaction, the withdrawal key of the UOP 6 is pressed, which is reported to the server 100. By this, the APL of the server 100 moves to the transaction start processing, and issues the transaction start command to the ATM 1. In the ATM 1, the I/O control 170 calls up the transaction control library 178 via a higher process (e.g. browser), sets the transaction processing start status, and acquires the transaction information.

Then the APL of the server 100 moves to the card start processing as the acquisition of the transaction information ends, and issues the card insertion processing command to the ATM 1. In the ATM 1, the I/O control 170 calls up the transaction control library 178 via a higher process (e.g. browser), sets the card insertion processing status, and displays the card insertion screen on the customer operation screen of the UOP 6.

And according to the card insertion command, the I/O control 170 calls up the card control library 172, and starts up the card unit 10. When the card unit 10 detects the insertion of the card and reads the card, the card control library 172 notifies the insertion of the card to the APL of the server 100. And the APL of the server 100 issues the transaction information acquisition command to the ATM 1, and in the ATM 1, the I/O control 170 calls up the transaction control library 178 via a higher process (e.g. browser), and acquires the transaction status (card insertion detection and card read data in this case).

When the card insertion processing ends, the APL of the server 100 moves to the identification number input processing, and issues the identification number processing command of the ATM 1. In the ATM 1, the I/O control 170 calls up the ten-key control library 173 via a higher process (e.g. browser), and displays the identification number input screen on the customer operation screen of the UOP 6. The ten-key control library 173 monitors the ten-key input status of the UOP 6, and notifies the ten-key input completion to the server 100.

When the ten-key input completes, the APL of the server 100 moves the amount input processing, and issues the amount input processing command to the ATM 1. In the ATM 1, the I/O control 170 calls up the ten-key control library 173 via a higher process (e.g. browser), and displays the amount input screen on the customer operation screen of the UOP 6. The ten-key control library 173 monitors the ten-key input status of the UOP 6, and notifies the ten-key input (amount input, confirmation key) completion to the server 100.

When the amount input processing completes, the APL of the server 100 moves to the host communication processing, issues the host communication processing command to the ATM 1, acquires the card data, identification number and the amount from the ATM 1, and displays the "Please Wait" screen on the customer operation screen of the UOP 6.

When the authentication and balance update processing completes, the APL of the server 100 moves to the transaction printing processing, and issues the print command to the ATM 1. In the ATM 1, the I/O control 170 calls up the receipt control library 174 via a higher process (e.g. browser), and the receipt printer 20 prints the receipt.

Then the APL of the server 100 moves to the bill feed processing, and issues the bill feed command to the ATM 1. In the ATM 1, the I/O control 170 calls up the bill control library 175 via a higher process (e.g. browser), starts up the bill unit 50, and feeds the bill.

When the bill feed processing completes, the APL of the server 100 moves to the medium ejection processing, and issues the medium ejection command to the ATM 1. In the ATM 1, the I/O control 170 calls up the card control library 172, receipt control library 174 and bill control library 175 via a higher process (e.g. browser), and displays the medium ejection screen on the customer operation screen of the UOP 6. By this, the card is ejected from the card unit 10, the receipt is ejected from the receipt printer 20, and the bill is ejected from the bill unit 50.

The APL of the server 100 receives the removal completion notice from the ATM 1, moves to the transaction end processing, and issues the transaction end command to the ATM 1. In the ATM 1, the I/O control 170 displays the end screen on the customer operation screen of the UOP 6 via a higher process (e.g. browser). At the same time, the I/O control 170 sets the transaction status to be processing end in the transaction control library 178, and acquires information of the other control libraries 171-177. Then the APL of the server 100 returns to the above mentioned customer wait processing.

In this way, the interface of the ATM application of the server 100 and the ATM 1 can be commonly used for general withdrawal processing, regardless the manufacturer and the model of the ATM 1. By this, an interface common to each ATM can be constructed. This is the same for a deposit transaction and a balance inquiry.

[Customization Method of Conventional ATM Middleware]

Then modification is necessary so that ATMs can operate with this common interface, even if the specifications of the I/O unit and the specifications of the ATM middleware differ depending on the model of the ATM. In this case, designing an ATM middleware itself to match the common interfaces decreases the significance of establishing a common interface.

Therefore a conventional ATM middleware for operating an I/O unit is utilized and customized so that the ATM can operate with a common interface.

Figure 8:
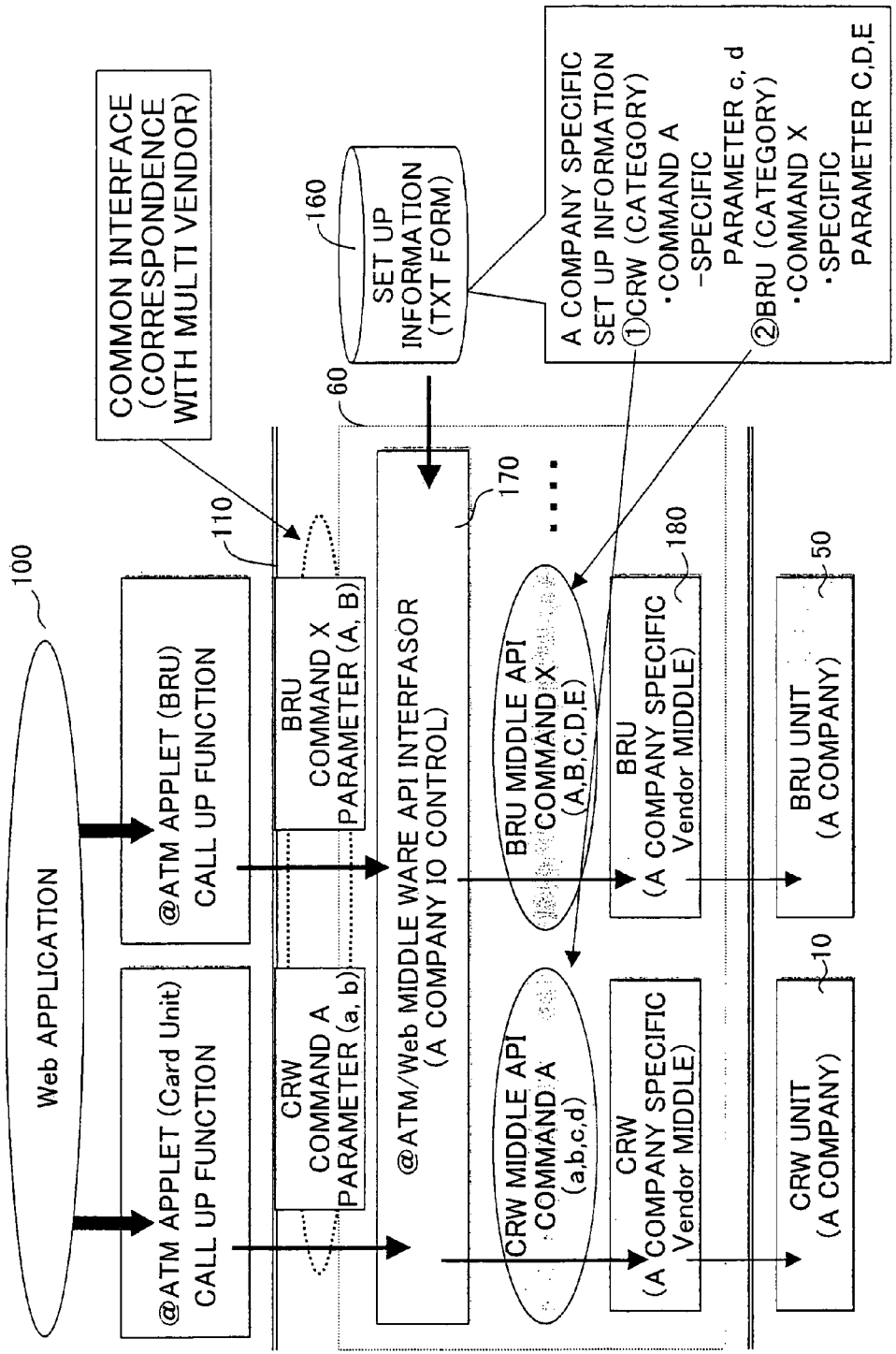
FIG. 8 is a diagram depicting the operation according to an embodiment of the present invention.
Figure 9:
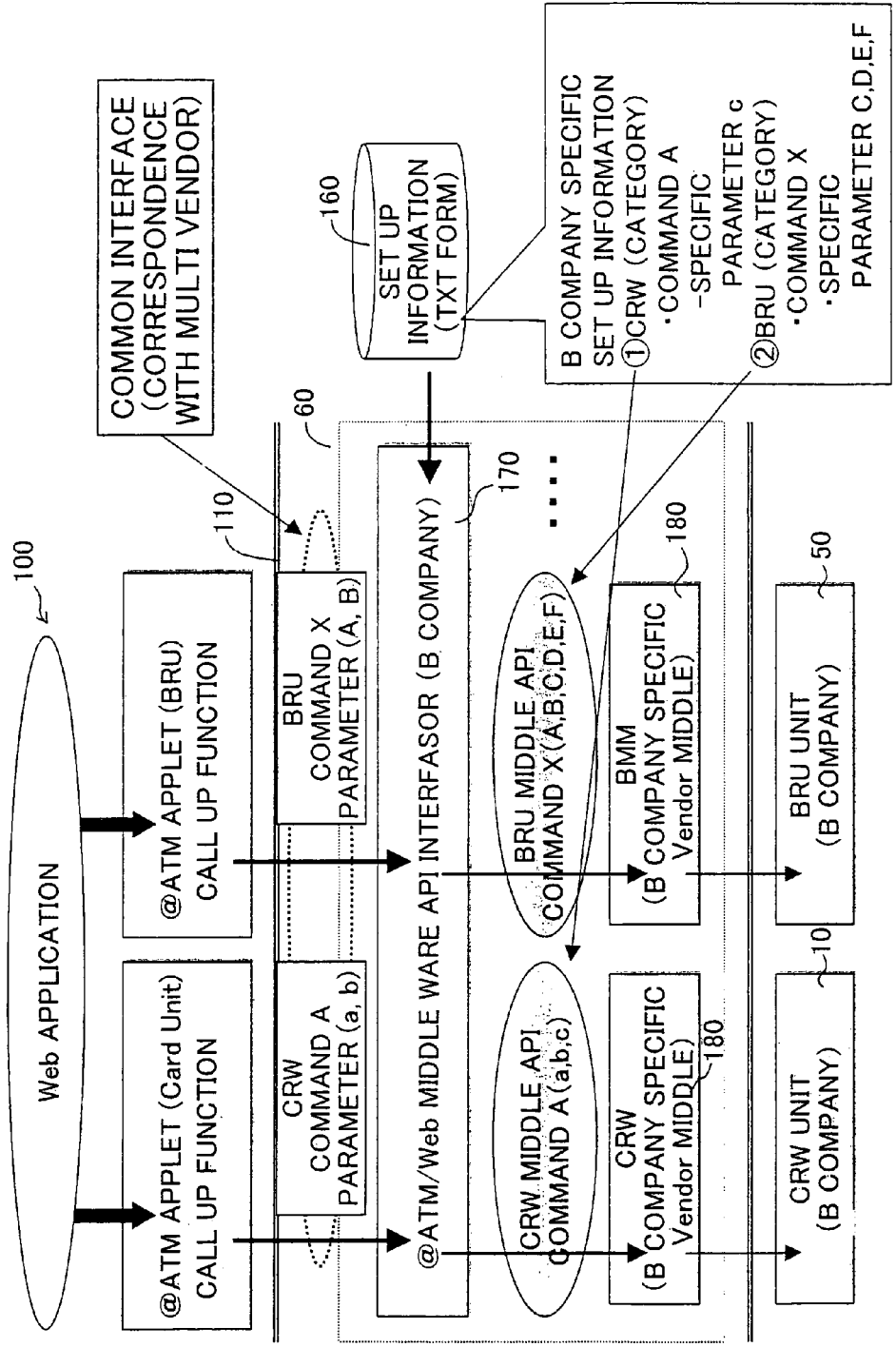
FIG. 9 is a diagram depicting the operation according to another embodiment of the present invention.
Figure 11:
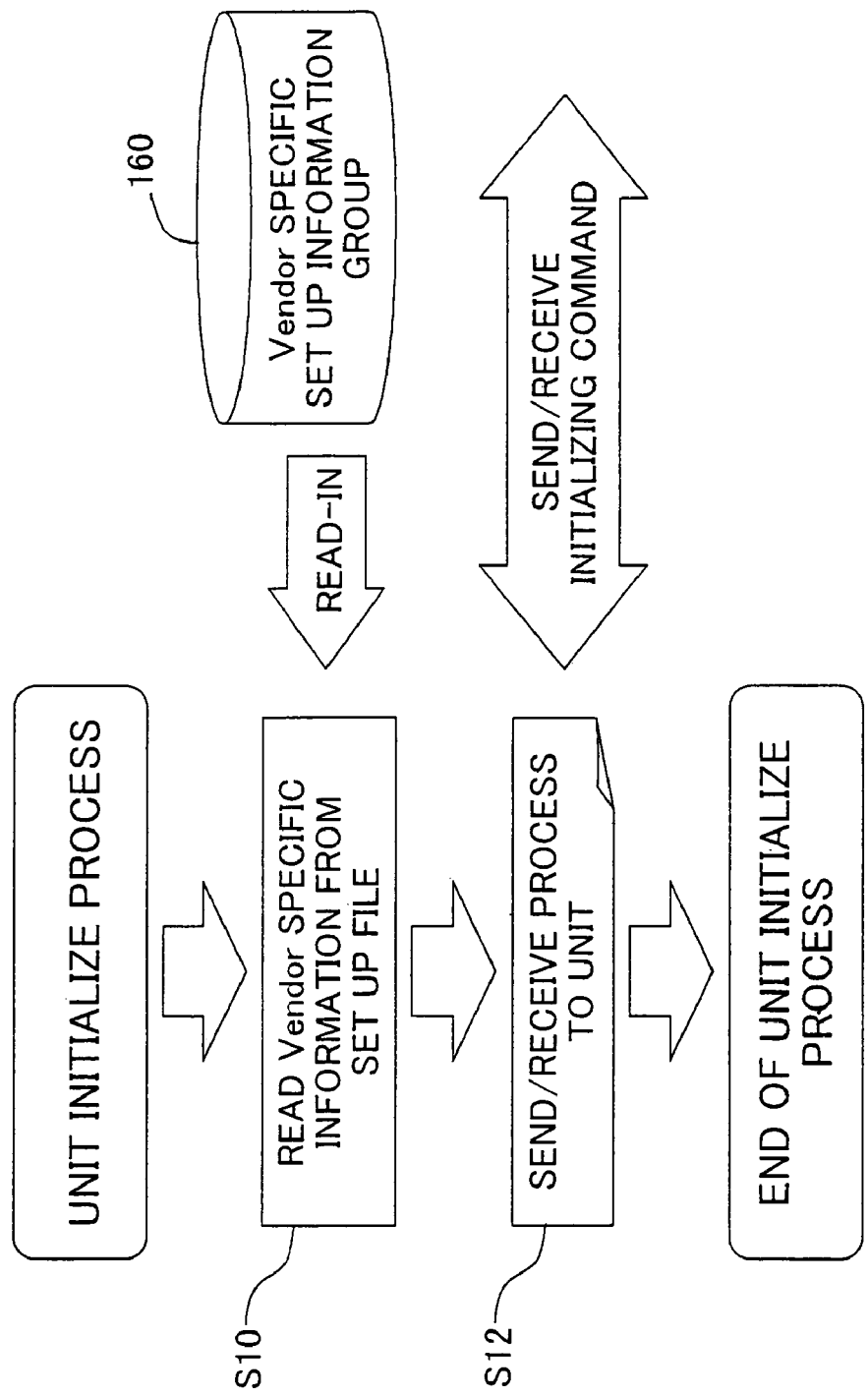
FIG. 11 is a flow chart depicting the initialization interface conversion processing in the I/O control library.
Figure 12:
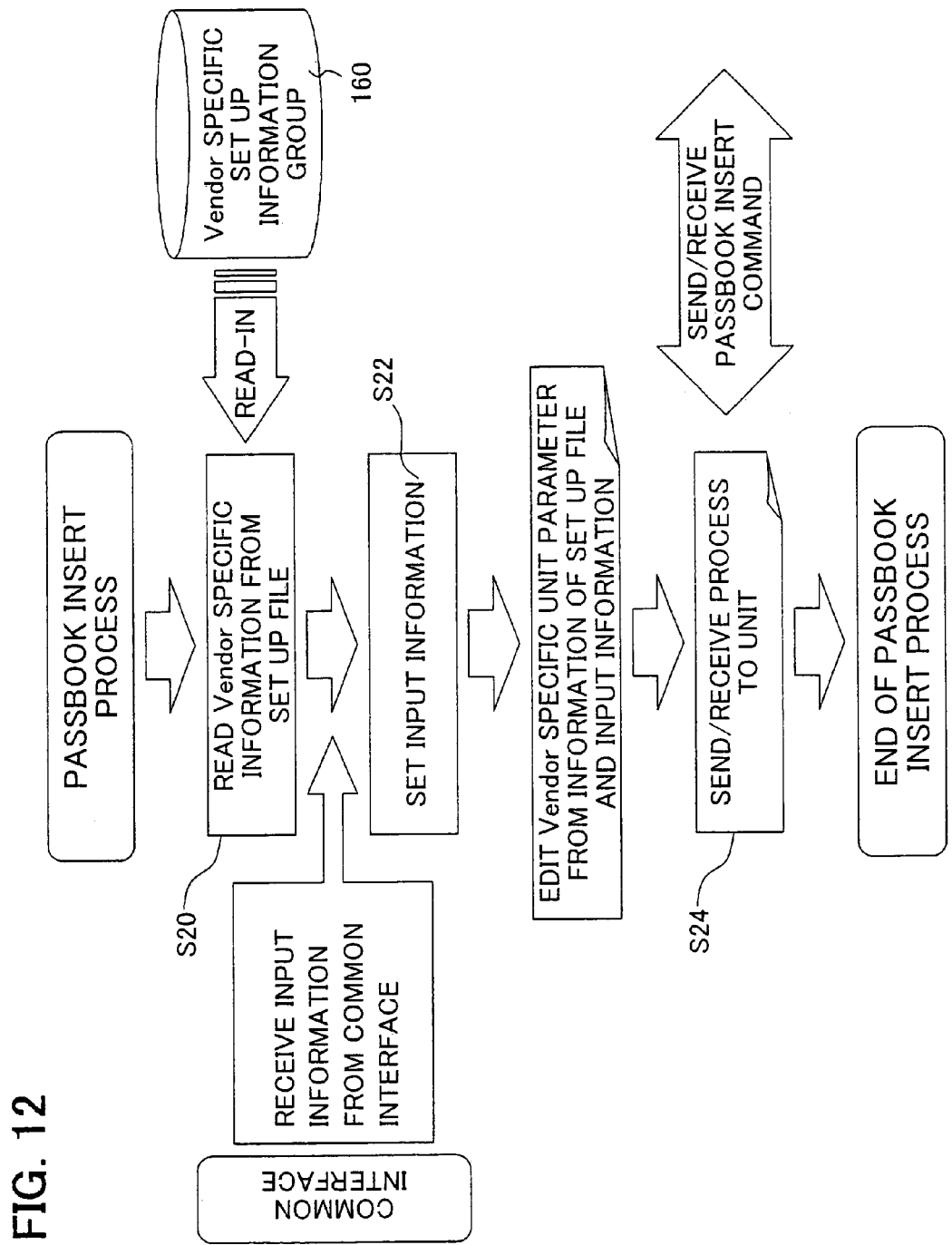
FIG. 12 is a flow chart depicting the interface conversion processing of the passbook insertion processing in the I/O control library.

FIG. 8 and FIG. 9 are diagrams depicting the operation of an embodiment of the present invention, FIG. 10 is a table showing common interfaces thereof and vender specific interfaces, and FIG. 11 and FIG. 12 are flow charts depicting the interface conversion processing in the I/O control library.

In FIG. 8 and FIG. 9, the ATM application of the server 100 is a Web application, and the CRW (card unit) command and the BRU (bill unit) command with parameters a and b, and A and B are issued as a common interface in the ATM applet function call up format of Java (registered trademark).

On the other hand in the ATM 1, as described in FIG. 3, the parameter file 160 stores the input parameters/fixed parameters which are uniquely determined by the system specifications of each vender. In FIG. 8, the specific parameters c and d are stored for the CRW command A, and the specific parameters C, D and E are stored for the BRU command X as the setup information specific to the company A.

In the same way, in FIG. 9, the specific parameter c is stored for the CRW command A, and the specific parameters C, D, E and F are stored for the BRU command X as the setup information specific to the company B.

The I/O control layer 170 calls up the parameter specific to each I/O client layer from this parameter file 160 when the ATM middleware 180, including the I/O client layer 190, is called up, and converts the common API into the conventional client API.

For example, in FIG. 8, the I/O control layer 170 converts the CRW command A (a, b) of the common interface (API) into the command A (a, b, c, d) of the CRW middle API, sends it to the CRW middleware 180, and operates the CRW unit 10, and also converts the BRU command X (A, B) of the common interface (API) into the command X (A, B, C, D, E) of the BRU middle API, sends it to the BRU middleware 180, and operates the BRU unit 50.

In the same way, in FIG. 9, the I/O control layer 170 converts the CRW command A (a, b) of the common interface (API) into the command A (a, b, c) of the CRW middle API, sends it to the CRW middleware 180, and operates the CRW unit 10, and also converts the BRU command X (A, B) of the common interface (API) into the command X (A, B, C, D, E, F) of the BRU middle API, sends it to the BRU middleware 180, and operates the BRU unit 50.

This will be described using a specific example of the passbook processing command in FIG. 10. For the unit initialization command, the vender specific interfaces (parameters) to be used are the passbook printer user type code, passbook ribbon near end check Yes/No specification, passbook MS (Magnetic Stripe) error pause Yes/No specification, passbook page mark up and down use Yes/No specification, and page closing Yes/No specification when a forgotten passbook is taken in, which can be specified depending on the specifications of the passbook unit of each vender.

For the passbook insertion processing command, the common interfaces (parameters) to be provided are the insertion medium logic type specification, passbook type number specification, W-MS (Wide Magnetic Stripe) switching specification, stripe position specification, MS erase Yes/No specification, specified line position specification, composite operation specification, and camera control (camera is operated when a passbook is inserted) specification.

The vender specific interfaces (parameters) to be provided, on the other hand, are the MS position specification (e.g. the case when the position of the MS of the passbook is different depending on the financial institution), MS type (recording format), MS parameter (e.g. whether MS data is erasable), line lamp control specification (when a line lamp exists at the passbook entry and the lamp is turned ON at insertion and at ejection).

FIG. 11 is a flow chart depicting the above mentioned unit initialization processing.

(S10) When the unit initialization command is received, the vender specific setup information (parameters) on initialization are read from the parameter file 160.

(S12) The read parameters are attached to the initialization command, are then sent to the unit, and a reply is received.

FIG. 12 is a flow chart depicting the above mentioned passbook insertion processing.

(S20) When the passbook insertion command is received, the vender specific setup information (parameters) on the passbook information are read from the parameter file 160.

(S22) From the read parameters and the parameters received from the common interface (input information), the parameters of the vender specific unit are edited.

(S24) The edited parameters are attached to the passbook insertion command, are then sent to the unit, and a reply is received.

In this way, the vender specific parameters are set in the parameter file 160 in advance, and the I/O control layer 170 edits the parameters of the command of the common interface (API) and the vender specific parameters of the parameter file 160, converts it into the command of the ATM middle API, sends it to the ATM middleware, and operates the vender specific I/O unit 10, so the vender specific I/O unit can be operated by the command of the common interface (API). In other words, conventional ATM middleware can be customized so as to operate with a standard interface.

[Configuration of I/O Control Layer]

Figure 14:
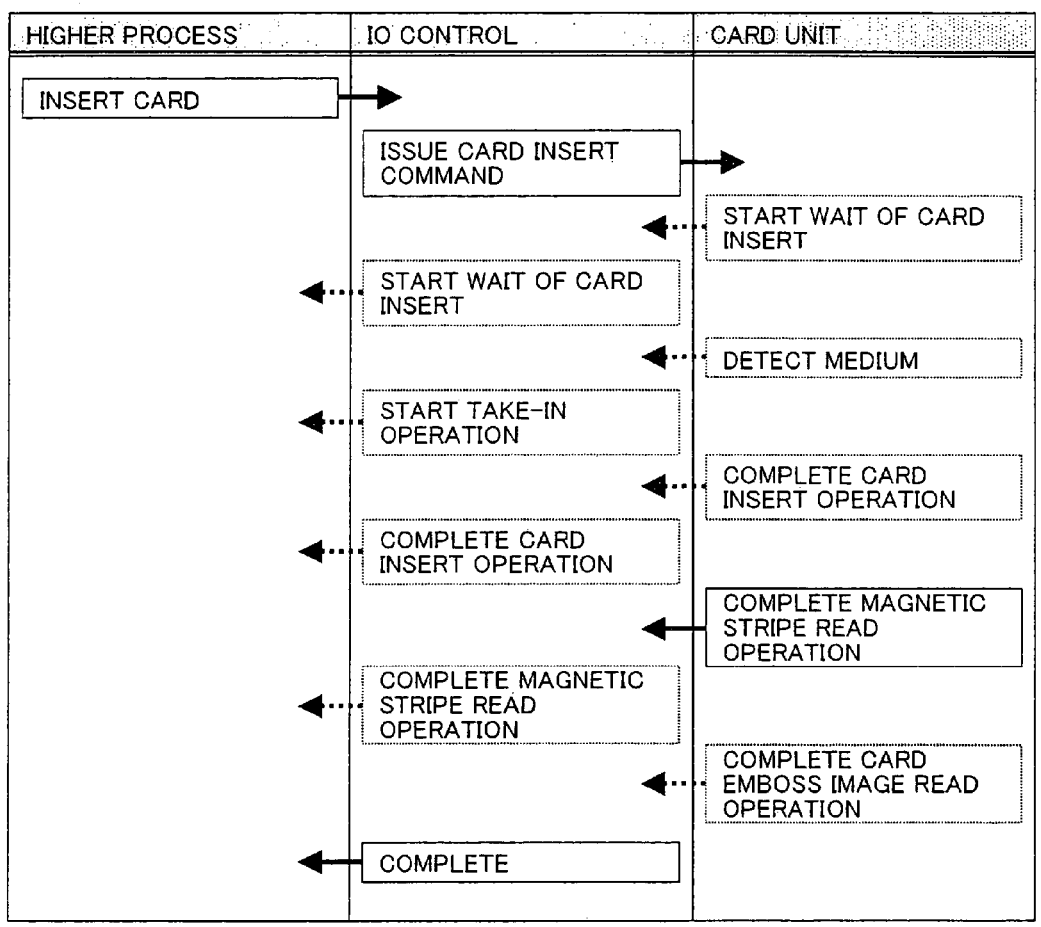
FIG. 14 is a diagram depicting the card insertion operation.
Figure 15:
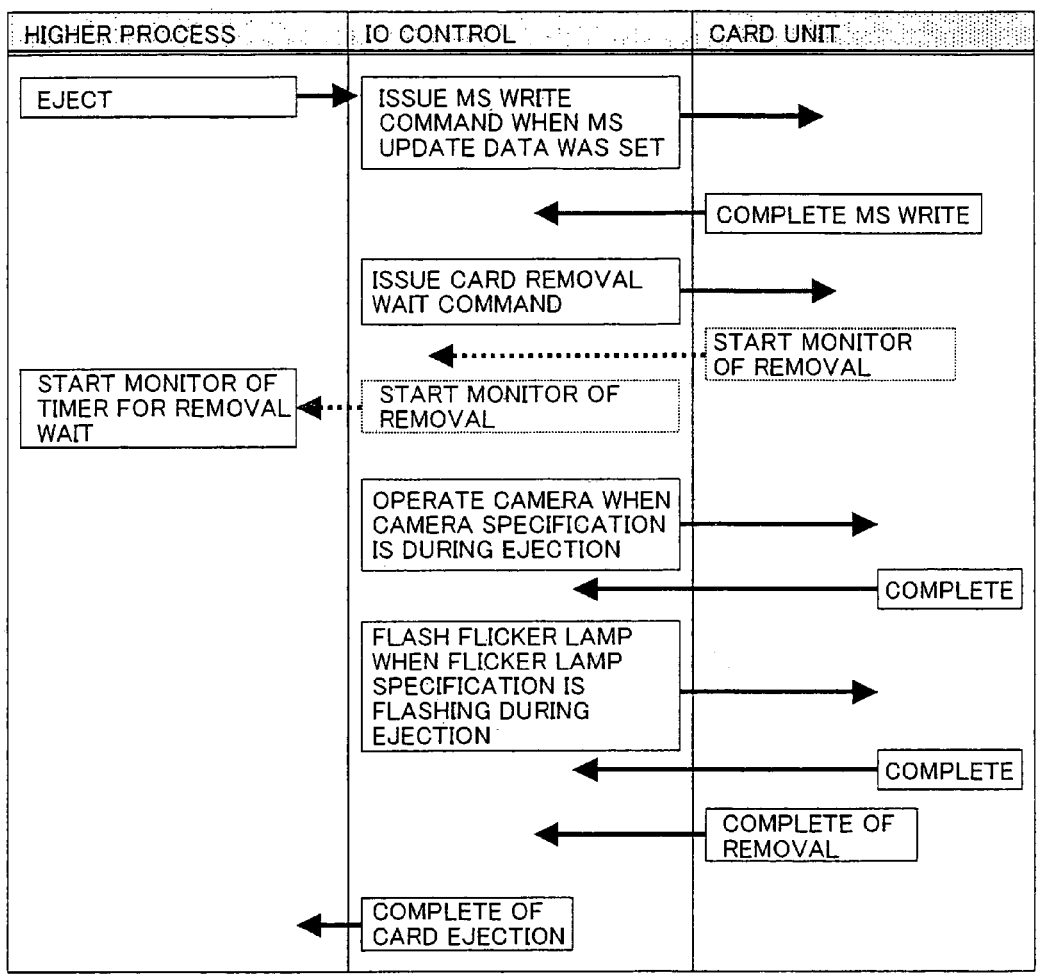
FIG. 15 is a diagram depicting the card ejection operation.

Now each control library of the I/O control layer will be described. At first, the CRW control library will be described. FIG. 13 is a table showing the vender specific parameters of the card (CRW) unit command, FIG. 14 is a diagram depicting the card insertion operation, and FIG. 15 is a diagram depicting the card ejection operation.

As FIG. 13 shows, for the vender specific parameters of the CRW, the initialization parameter, ejection parameter, card insertion parameter, MS write parameter, forced ejection parameter and issue parameter are provided.

The initialization parameter specifies the basic parameters required for the initialization processing operation of the CRW client. In other words, the initial values of the vender specific middleware are specified. The ejection parameter specifies the parameters required for ejecting the medium. For example, the specification on whether the line lamp is turned ON when the medium is ejected is specified.

The card insertion parameter specifies the parameters when special processing is required for inserting a card. The MS write parameter specifies the parameters required for writing magnetic data to the magnetic stripe of a card. For example, data write availability, and the vender and user specific data are specified.

The force-ejection parameter specifies the parameters required for a force-ejection of the medium. For example, force-ejection availability is specified. The issue parameter specifies the parameters required for issuing a bank transfer card. The specifications of the bank transfer card can be originally determined by the user, where these parameters can be specified.

FIG. 14 is a diagram depicting the operation of the CRW control library 172 and the card unit 10 when the card insertion command is received. When the card insertion command of the common API is received from the browser 120, which performs a higher process, the CRW control library 172 edits the vender specific parameters and the input parameters, just like the case of the abovementioned FIG. 12, and issues the card insertion command to the card unit 10.

The card unit 10 starts card insertion waiting and notifies the card insertion waiting, and when the medium is detected, the card unit 10 notifies this to the library 172, and starts taking in the card, and the library 172 notifies the start of the take in operation to the browser 120. When the card unit 10 completes the card insertion operation, the card unit 10 notifies this to the library 172, and extends this notification to the browser 120.

When the reading of the magnetic stripe of the card is completed, the card unit 10 notifies this to the library 172, and extends this notification to the browser 120. When the reading of the embossed image of the card is completed, the card unit 10 notifies this to the library 172, and also notifies the completion of insertion to the browser 120. By this, the processing of the card insertion command ends.

FIG. 15 is a diagram depicting the operation of the CRW control library 172 and the card unit 10 when the card ejection command is received. When the card ejection command of the common API is received from the browser 120, which performs a higher process, the CRW control library 172 edits the vender specific parameters and the input parameters, just like the case of the abovementioned FIG. 12. And if MS update data has been set with the vender specific parameters, then the MS write command is issued to the card unit 10 as the card ejection command.

The card unit 10 writes the MS and ejects the card. When writing the MS completes, the card unit 10 notifies this to the library 172. The library 172 issues the card removal wait command to the card unit 10, and the card unit 10 notifies the start of removal monitoring to the library 172. The library 172 notifies the card removal monitoring start to the browser 120, and the browser 120 starts the removal wait timer monitoring. When the camera specification is "During Ejection", the library 172 notifies of operation of the monitoring camera to the card unit 10, and the card unit 10 notifies completion.

When the vender specific parameter indicates flashing at ejection time in the flicker lamp specification, the library 172 instructs the flashing of the flicker lamp to the card unit 10. The card unit 10 notifies the completion of processing and removal completion, and also notifies card ejection completion to the browser 120. By this, the card ejection command processing ends.

Figure 17:
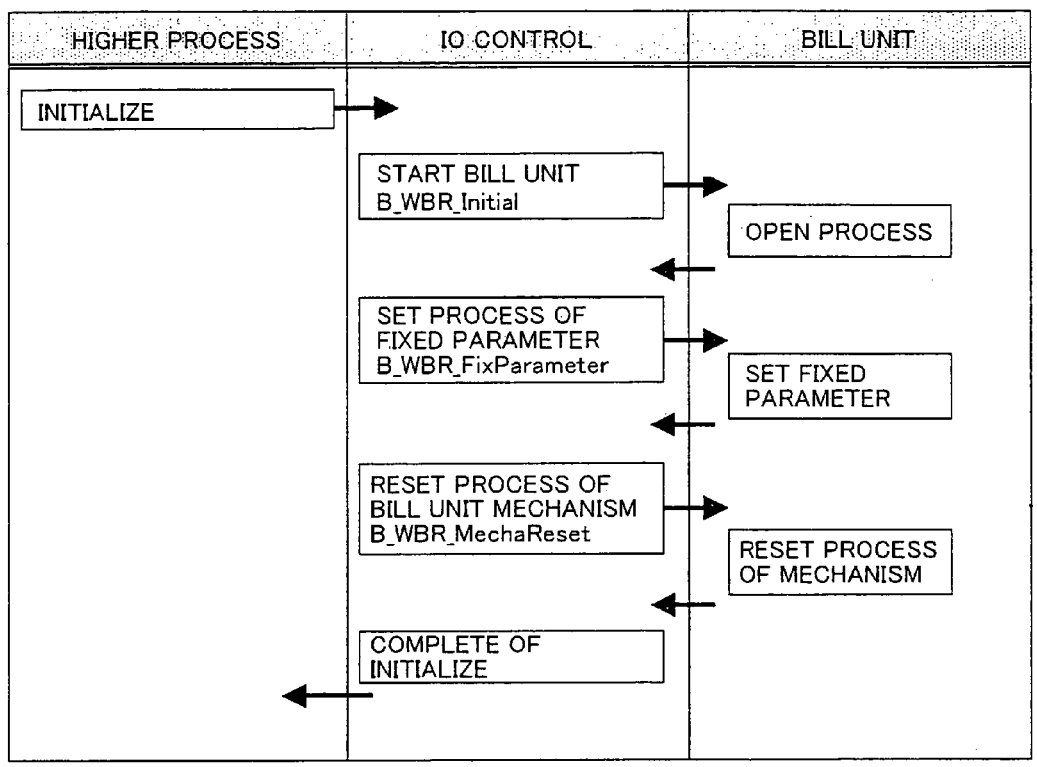
FIG. 17 is a diagram depicting the initialization operation of the bill unit.
Figure 18:
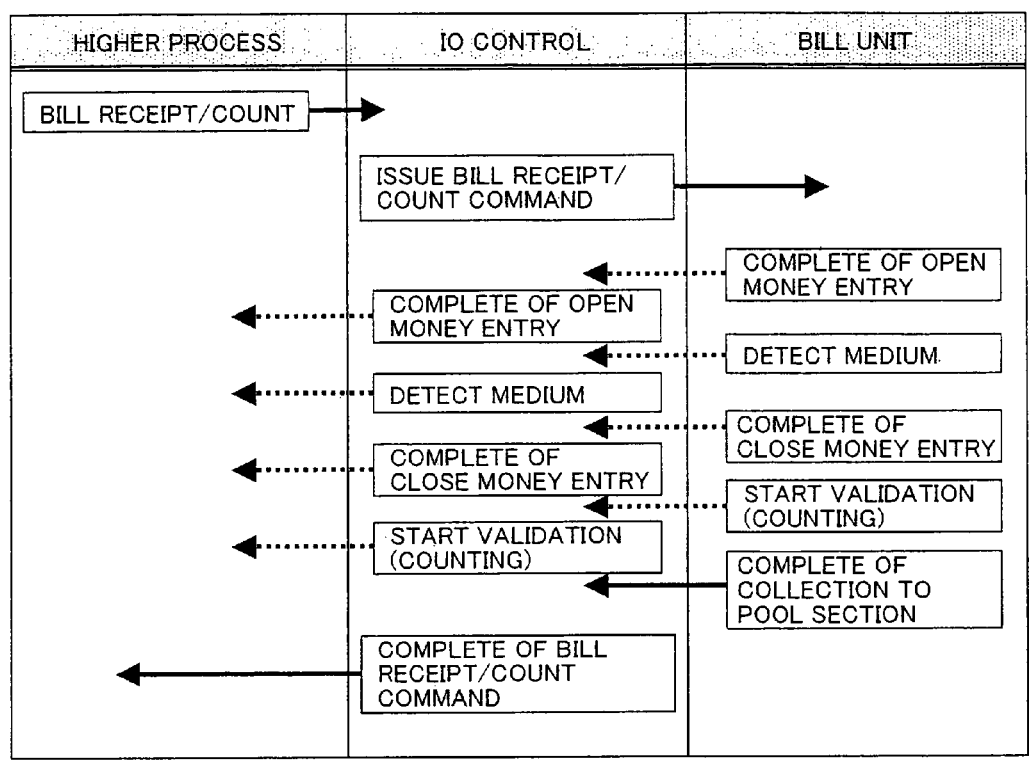
FIG. 18 is a diagram depicting the bill acceptance/counting operation.
Figure 19:
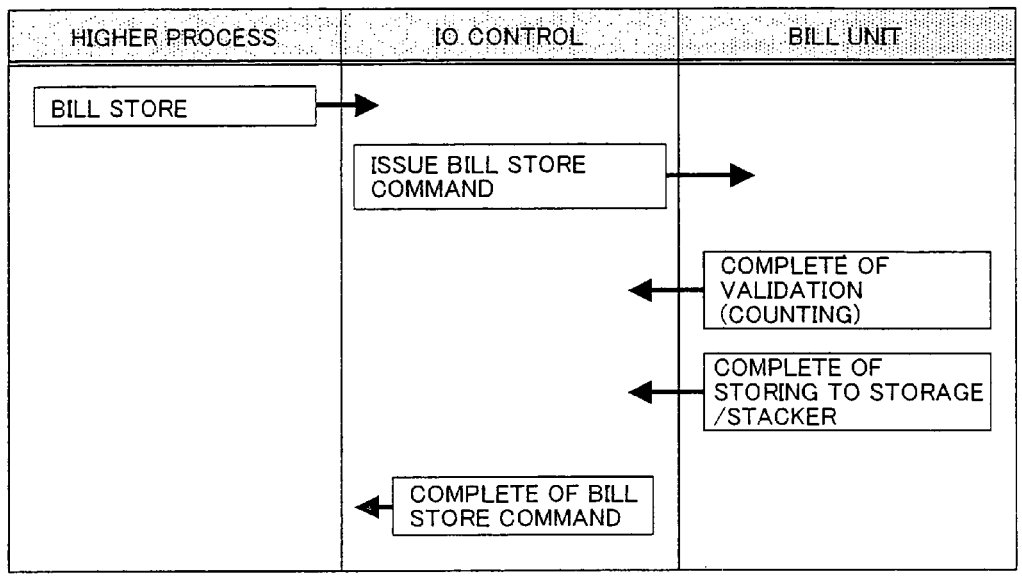
FIG. 19 is a diagram depicting the bill storing operation of the bill unit.
Figure 20:
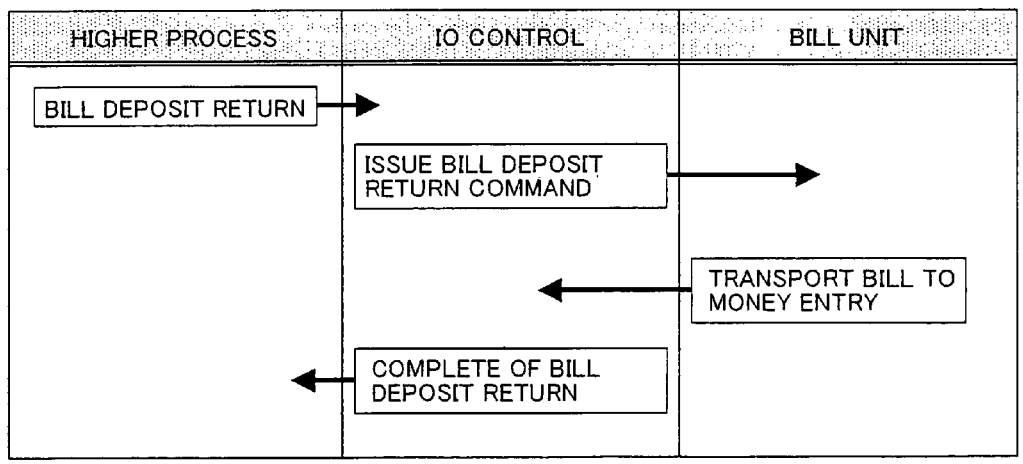
FIG. 20 is a diagram depicting the bill deposit return.
Figure 21:
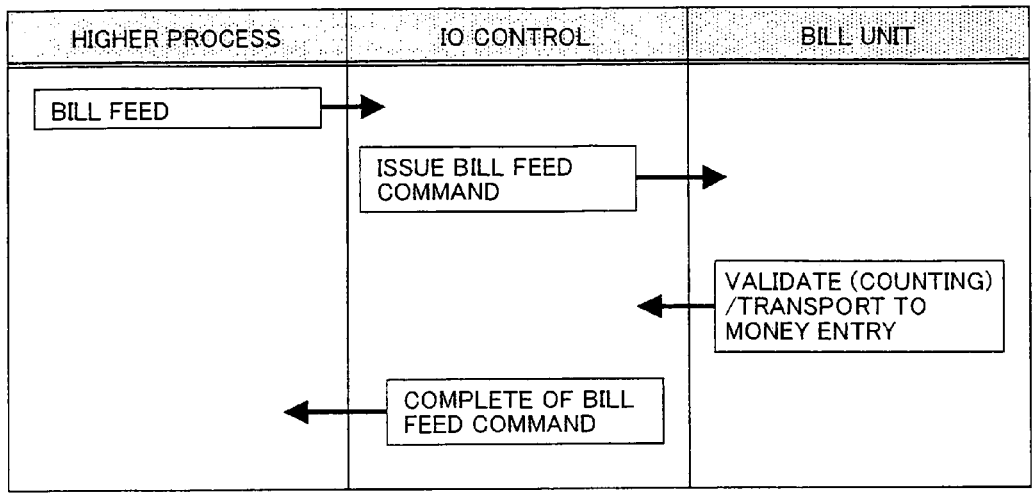
FIG. 21 is a diagram depicting the bill feeding operation of the bill unit.
Figure 22:
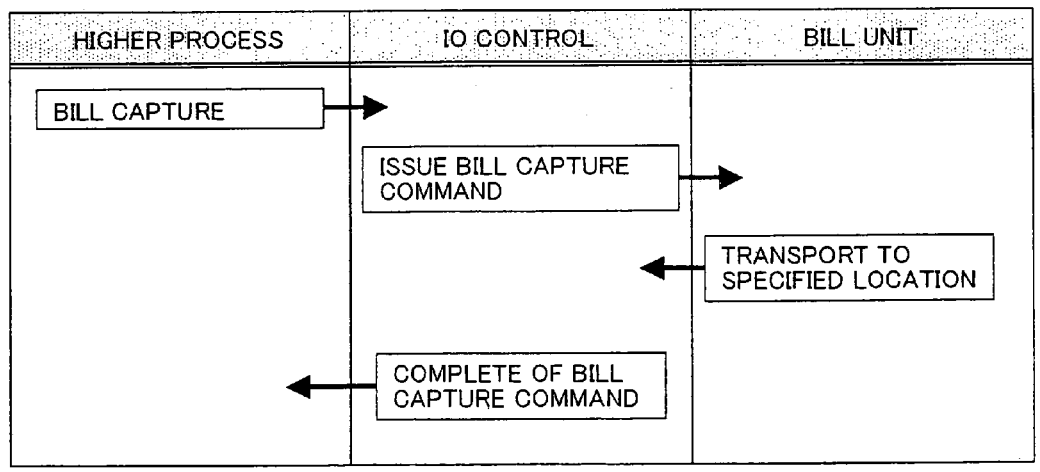
FIG. 22 is a diagram depicting the bill capturing operation.
Figure 23:
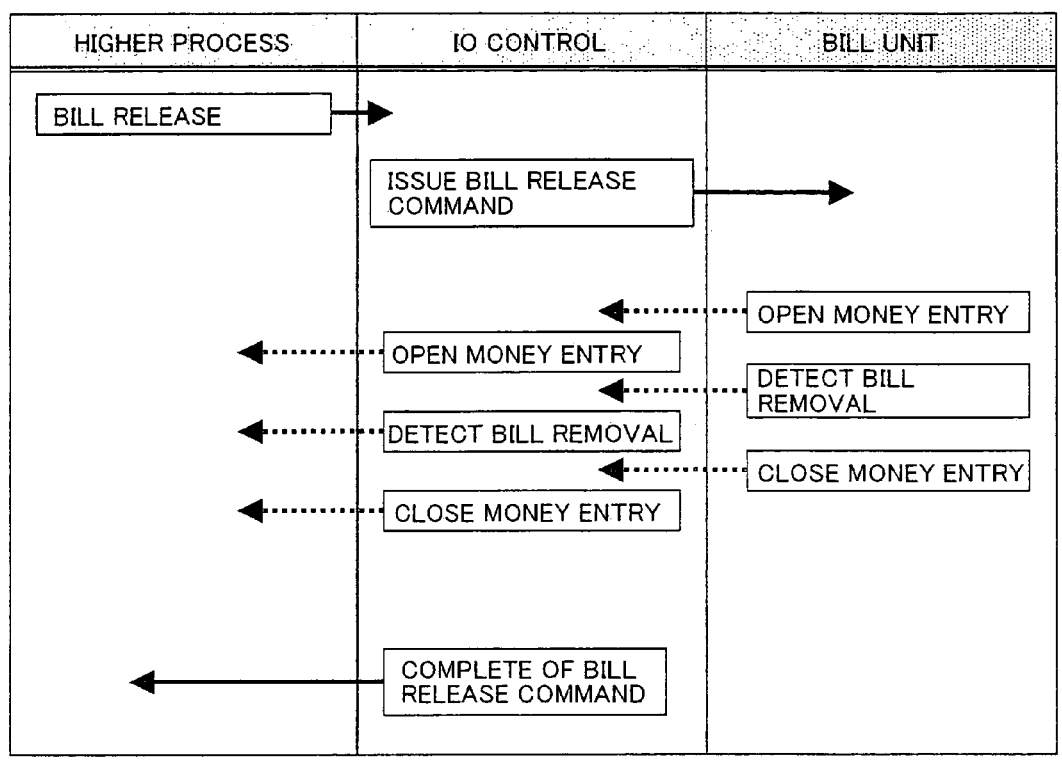
FIG. 23 is a diagram depicting the bill releasing operation.

Now the bill control library 175 will be described. FIG. 16 is a table showing the vender specific parameters of the bill (BRU) unit command, FIG. 17 is a diagram depicting the initialization processing of the bill unit, FIG. 18 is a diagram depicting the bill acceptance/counting operation, FIG. 19 is a diagram depicting the bill storing operation of the bill unit, FIG. 20 is a diagram depicting the bill deposit returning, FIG. 21 is a diagram depicting the bill feeding operation of the bill unit, FIG. 22 is a diagram depicting the bill capturing operation, FIG. 23 is a diagram depicting the bill releasing operation, and FIG. 24 is a block diagram depicting the target bill unit.

Figure 24:
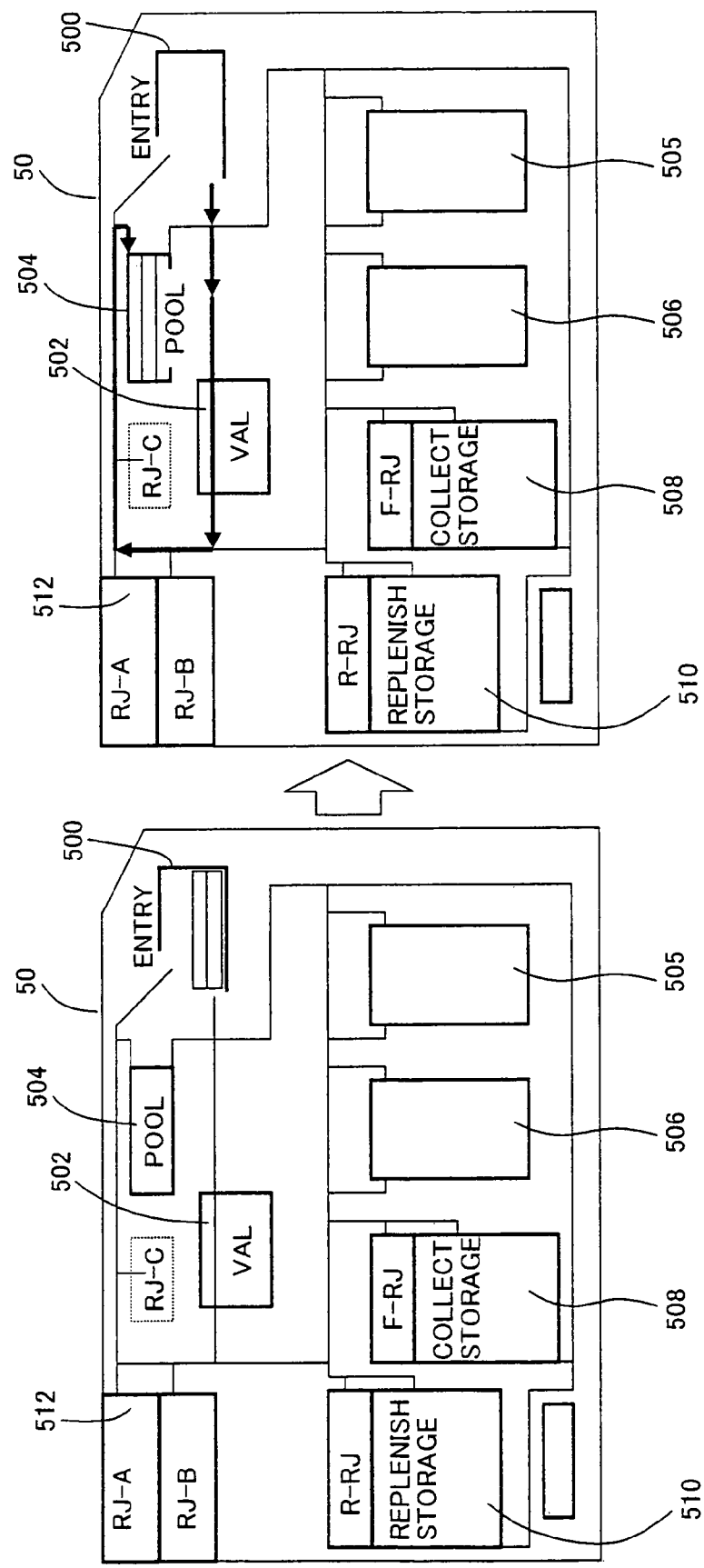
FIG. 24 is a diagram depicting the configuration of the bill unit to be a target.

As FIG. 24 shows, the bill unit 50 is a bill recycling type deposit/withdrawal machine, comprising a money entry 500, validation section 502, pool section 504, bill stackers 505 and 506, collected money storage 508, replenishment money storage 510 and reject box 512.

As FIG. 16 shows, as the vender specific parameters of the BRU, the initialization parameter, bill acceptance parameter, bill counting parameter, bill acceptance/counting parameter, bill feeding parameter, bill ejection parameter, transport path check parameter and jam reset parameter are provided.

The initialization parameter specifies the basic parameters for the initialization processing operation of the BRU client. In other words, the initial values of the vender specific middleware are specified. The bill acceptance parameter specifies the parameters required for waiting for bill insertion. For example, the alarm during bill insertion waiting Yes/No and wait time are specified.

The bill counting parameter specifies the parameters required for validating (counting) bills. For example, the maximum number of bills to be identified is specified. The bill acceptance/counting parameter specifies the parameters required for waiting for bill insertion and validation (counting) of bills.

The bill feeding parameter specifies the parameters required for feeding the specified denomination, validation (counting) and storing at the money entry. For example, reject availability is specified. The bill release parameter specifies the parameters required for releasing bills and the open/close control of the shutter. For example, the shutter open time and capturing availability are specified.

The transport path check parameter specifies the parameters required for a residual check on the BRU unit transport path. For example, the residual check position is set. The jam reset parameter specifies the parameters required for collecting jammed bills which are jammed up in the BRU. For example, the collection destination and retry count of collection are specified.

FIG. 17 is a diagram depicting the operation of the bill control library 175 and the bill unit 50 when the initialization command is received. When the BRU initialization command of the common API is received from the browser 120, which performs a higher process, the bill control library 175 edits the vender specific parameters and the input parameters, just like the case of the abovementioned FIG. 12, and issues the bill unit startup command to the bill unit 50.

The bill unit 50 executes the open processing of the unit, and notifies this to the library 175. The library 175 notifies the fixed parameters, including the vender specific parameters, to the bill unit 50, and sets these parameters. And the library 175 notifies the reset of the bill mechanism to the bill unit 50, and when the bill unit 50 completes the mechanism reset operation, the bill unit 50 notifies this library 175 and the library 175 also notifies the completion of initialization to the browser 120. By this, the processing of the initialization command ends.

FIG. 18 is a diagram depicting the operation of the bill control library 175 and the bill unit 50 when the bill acceptance/counting command is received. When the bill acceptance/counting command of the common API is received from the browser 120, which performs a higher process, the bill control library 175 edits the vender specific parameters and the input parameters, just like the case of the abovementioned FIG. 12, and issues the bill acceptance/counting command to the bill unit 50.

The bill unit 50 opens the money entry 500 (see FIG. 24), notifies the open completion to the library 175, and the library 175 notifies the open completion to the browser 120. When the bill unit 50 detects the medium (bill), the bill unit 50 notifies this to the library 175, and extends this notification to the browser 120.

When the bill unit 50 closes the money entry 500, the bill unit 50 notifies the close completion to the library 175, and also extends this notification the browser 120. When the bill unit 50 starts validation (counting) at the validation section 502, the bill unit 50 notifies this to the library 175, and extends this notification to the browser 120. When the bill unit 50 stacks the validated bills in the pool section 504, the bill unit 50 notifies the stacking completion to the library 175, and the library 175 notifies the completion of the bill acceptance/counting command to the browser 120. By this, the processing of the bill acceptance/counting command ends.

FIG. 19 is a diagram depicting the operation of the bill control library 175 and the bill unit 50 when the bill storing command is received. When the bill storing command of the common API is received from the browser 120, which performs a higher process, the bill control library 175 edits the vender specific parameters and the input parameters, just like the case of the abovementioned FIG. 12, and issues the bill storing command to the bill unit 50.

The bill unit 50 stores the bills in the bill stackers 505 and 506 while counting the bills in the pool section 504, and when counting completes, the bill unit 50 notifies the counting completion to the library 175, and when storing the bills in the bill storage/stackers 505 and 506 completes, the bill unit 50 notifies the storing completion to the library 175. In response to this, the library 175 notifies the completion of the bill storing command to the browser 120. By this, the processing of the bill storing command is completed.

FIG. 20 is a diagram depicting the operation of the bill control library 175 and the bill unit 50 when the bill deposit return command is received. When the bill deposit return command of the common API is received from the browser 120, which performs a higher process, the bill control library 175 edits the vender specific parameters and the input parameters, just like the case of the above mentioned FIG. 12, and issues the bill deposit return command to the bill unit 50.

The bill unit 50 transports the bills in the pool section 504 to the money entry 500. When the transport operation is completed, the bill unit 50 notifies this to the library 175, and also notifies the completion of the bill deposit return to the browser 120. By this, the processing of the bill deposit return command ends.

FIG. 21 is a diagram depicting the operation of the bill control library 175 and the bill unit 50 when the bill feeding command is received. When the bill feeding command of the common API is received from the browser 120, which performs a higher process, the bill control library 175 edits the vender specific parameters and the input parameters, just like the case of the abovementioned FIG. 12, and issues the bill feeding command to the bill unit 50.

The bill unit 50 feeds the bills from the stackers 505 and 506, and transports them to the money entrance 500 via the validation section 502. When the transport operation is completed, the bill unit 50 notifies this to the library 175, and also notifies the completion of the bill feeding command to the browser 120. By this, the processing of the bill deposit return command ends.

FIG. 22 is a diagram depicting the operation of the bill control library 175 and the bill unit 50 when the bill capturing command is received. When the bill capturing command of the common API is received from the browser 120, which performs a higher process, the bill control library 175 edits the vender specific parameters and the input parameters, just like the case of the abovementioned FIG. 12, and issues the bill capturing command to the bill unit 50.

The bill unit 50 transports the bills from the money entry 500 to a specified location (e.g. location specified by a vender specific parameters, reject box 512 in the case of FIG. 24). When the transport operation is completed, the bill unit 50 notifies this to the library 175, and also notifies the completion of the bill capturing command to the browser 120. By this, the processing of the bill capturing command ends.

FIG. 23 is a diagram depicting the operation of the bill control library 175 and the bill unit 50 when the bill release command is received. When the bill release command of the common API is received from the browser 120, which performs a higher process, the bill control library 175 edits the vender specific parameters and the input parameters, just like the case of the abovementioned FIG. 12, and issues the bill release command to the bill unit 50.

The bill unit 50 opens the money entry 500 (see FIG. 24) and notifies the open completion to the library 175, and the library 175 notifies the open completion to the browser 120. When the bill unit 50 detects the bill removal, the bill unit 50 notifies this to the library 175, and extends this notification to the browser 120.

When the bill unit 50 closes the money entry 500, the bill unit 50 notifies the close completion to the library 175, and extends this notification to the browser 120. And the library 175 notifies the completion of the bill release command to the browser 120. By this, the processing of the bill release command ends.

The coin control library 176 also performs a command processing similar to the bill control library 175.

Now the passbook control library 171, receipt control library 174 and journal control library 177 will be described.

Figure 28:
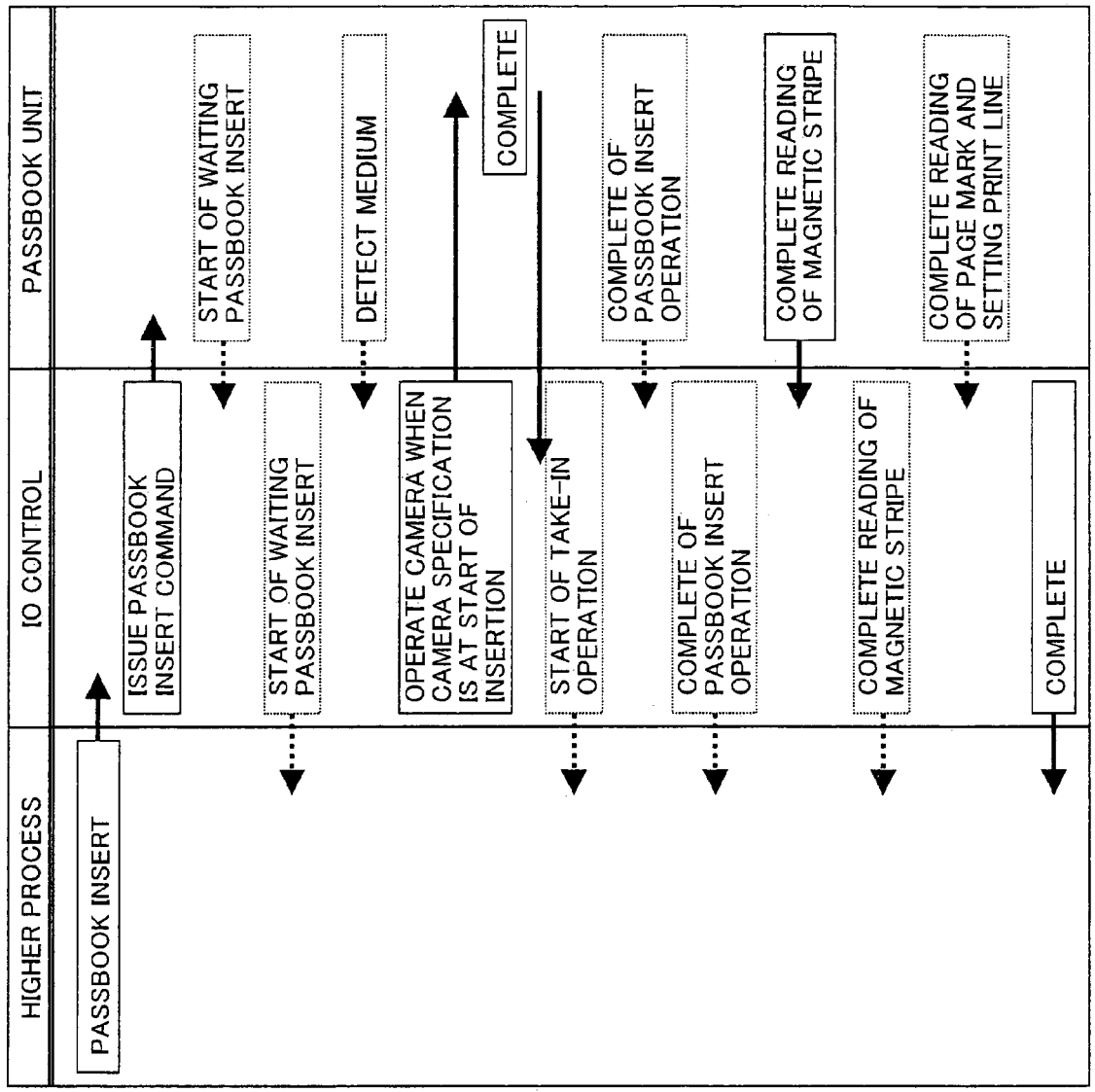
FIG. 28 is a diagram depicting the passbook insertion operation.
Figure 29:
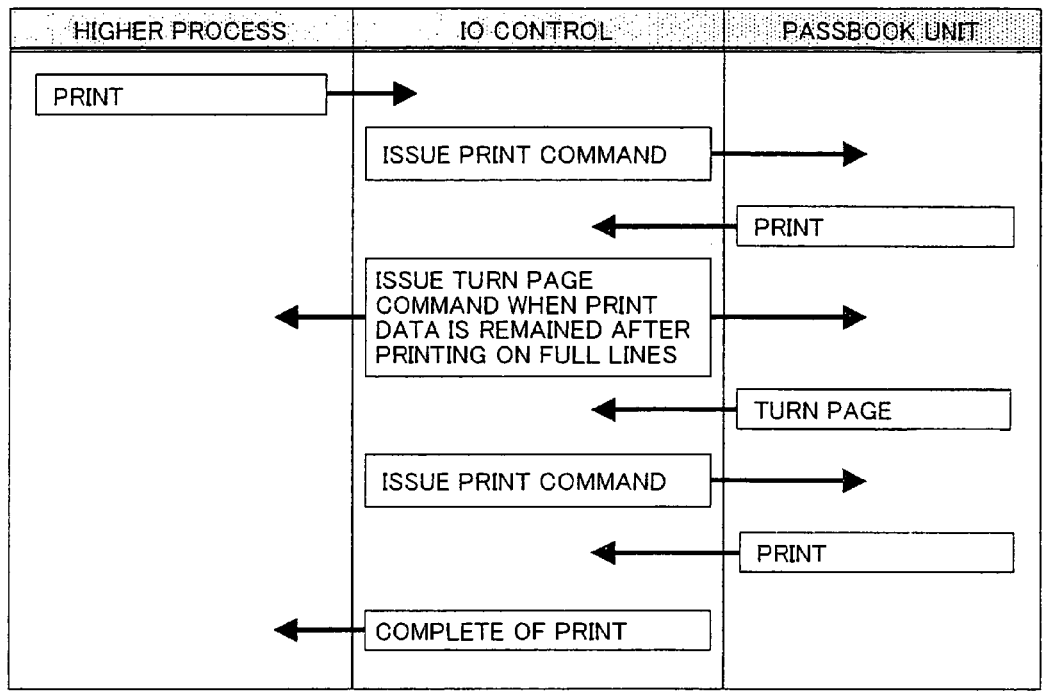
FIG. 29 is a diagram depicting the passbook printing operation.
Figure 30:
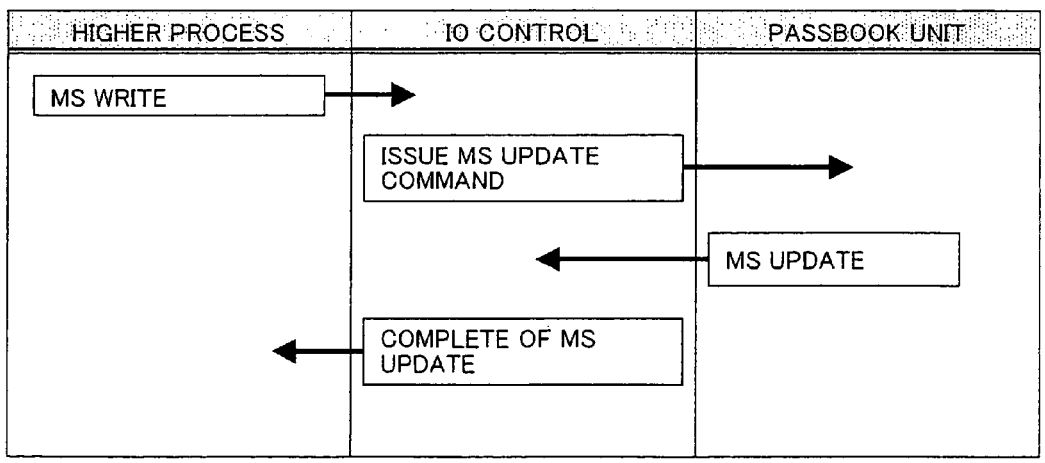
FIG. 30 is a diagram depicting the passbook MS write operation.
Figure 31:
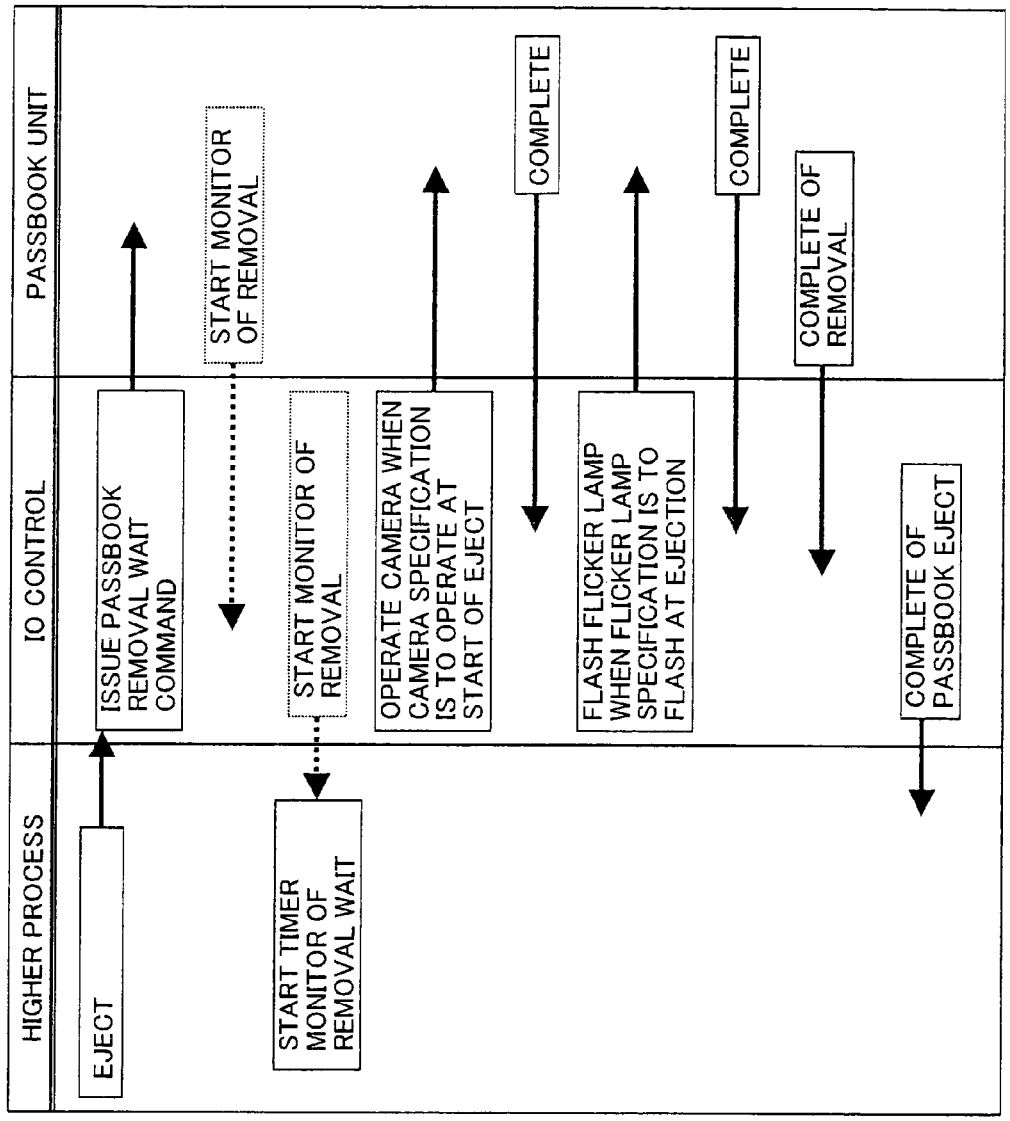
FIG. 31 is a diagram depicting the passbook ejection operation.

FIG. 25 is a table showing the vender specific parameters of the passbook (PPR) unit command, FIG. 28 is a diagram depicting the passbook insertion operation, FIG. 29 is a diagram depicting the passbook printing operation, FIG. 30 is a diagram depicting the passbook MS write operation, and FIG. 31 is a diagram depicting the passbook ejection operation.

As FIG. 25 shows, as the vender specific parameters of the PPR, the initialization parameter, ejection parameter, passbook insertion parameter, force-ejection parameter and issuing parameter are used.

The initialization parameter specifies the basic parameters required for the initialization processing operation of the PPR client. In other words, the initial values of the vender specific middleware are specified. The ejection parameter specifies the parameters required for ejecting the medium. For example, whether the line lamp is turned ON or not when the medium is ejected is specified.

The passbook insertion parameter specifies the parameters when special processing is required when the passbook is inserted. The force-ejection parameter specifies the parameters required for a force-eject of the medium. For example, force-ejection availability is specified. The issuing parameter specifies the parameters required for issuing the passbook/cut form. For example, a parameter for the user to originally determine the specifications of issuing a new passbook or a cut form can be specified.

FIG. 28 is a diagram depicting the operation of the PPR control library 171 and the passbook unit 40 when the passbook insertion command is received. When the passbook insertion command of the common API is received from the browser 120, which performs a higher process, the PPR control library 171 edits the vender specific parameters and the input parameters, just like the case of the above-mentioned FIG. 12, and issues the passbook insertion command to the passbook unit 40.

The passbook unit 40 starts passbook insertion waiting, notifies this, and when the medium is detected, the passbook unit 40 notifies this to the library 171. If it is specified to operate the camera when insertion is started, the library 171 instructs the passbook unit 40 to activate the monitor camera. The passbook unit 40 notifies the completion of the camera shot to the library 171, starts taking in the passbook, and the library 171 notifies the start of the take in operation to the browser 120. When the passbook unit 40 completes the passbook insertion operation, the passbook unit 40 notifies this to the library 172, and extends this notification to the browser 120.

When the passbook unit 40 completes the reading of the magnetic stripe of the passbook, the passbook unit 40 notifies this to the library 172, and extends this notification to the browser 120. Also the passbook unit 40 reads the page mark of the inserted passbook, and sets the print lines. The passbook unit 40 notifies the completion of setup to the library 172, and also notifies the insertion completion to the browser 120. By this, the processing of the passbook insertion command ends.

FIG. 29 is a diagram depicting the operation of the PPR control library 171 and the passbook unit 40 when the passbook printing command is received. When the passbook printing command of the common API is received from the browser 120, which performs a higher process, the PPR control library 171 edits the vender specific parameters and the input parameters, just like the case of the above-mentioned FIG. 12, and issues the print command to the passbook unit 40.

The passbook unit 40 sequentially prints on the passbook. When it is detected that the open page of the passbook is fully printed, the library 171 judges whether any print data remains, and if so, the library 171 issues the turn page command to the passbook unit 40, and notifies this to the browser 120. The passbook unit 40 notifies the completion of the turn page command to the library 171, and the library 171 issues the printing command to the passbook unit 40 again.

When the passbook unit 40 completes printing on the passbook, the passbook unit 40 notifies this to the library 171, and also notifies the completion of printing to the browser 120. By this, the processing of the passbook printing command ends.

FIG. 30 is a diagram depicting the operation of the PPR control library 171 and the passbook unit 40 when the passbook MS write command is received. When the passbook MS write command of the common API is received from the browser 120, which performs a higher process, the PPR control library 171 edits the vender specific parameters and the input parameters, just like the case of the above mentioned FIG. 12, and issues the MS update command to the passbook unit 40.

The passbook unit 40 updates the magnetic stripe (MS) of the passbook. When the MS update of the passbook is completed, the passbook unit 40 notifies this to the library 171, and also notifies the completion of the MS update to the browser 120. By this, the processing of the passbook MS write command ends.

FIG. 31 is a diagram depicting the operation of the PPR control library 171 and the passbook unit 40 when the passbook ejection command is received. When the passbook ejection command of the common API is received from the browser 120, which performs a higher process, the PPR control library 171 edits the vender specific parameters and the input parameters, just like the case of the above-mentioned FIG. 12. And the library 171 issues the passbook removal wait command to the passbook unit 40, and the passbook unit 40 notifies the removal monitoring start to the library 171.

The library 171 notifies the passbook removal monitoring start to the browser 120, and the browser 120 starts removal wait timer monitoring. If the camera specification is "During Ejection", the library 171 notifies the operation of the monitor camera to the passbook unit 40, and the passbook unit 40 notifies completion.

If the specification of the flicker lamp is "Flashing During Ejection" in the vender specific parameters, the library 171 instructs the passbook unit 40 to flash the flicker lamp. The passbook unit 40 notifies the completion of this processing and the completion of removal, and also notifies the completion of passbook ejection to the browser 120. By this, the processing of the passbook ejection command ends.

Figure 32:
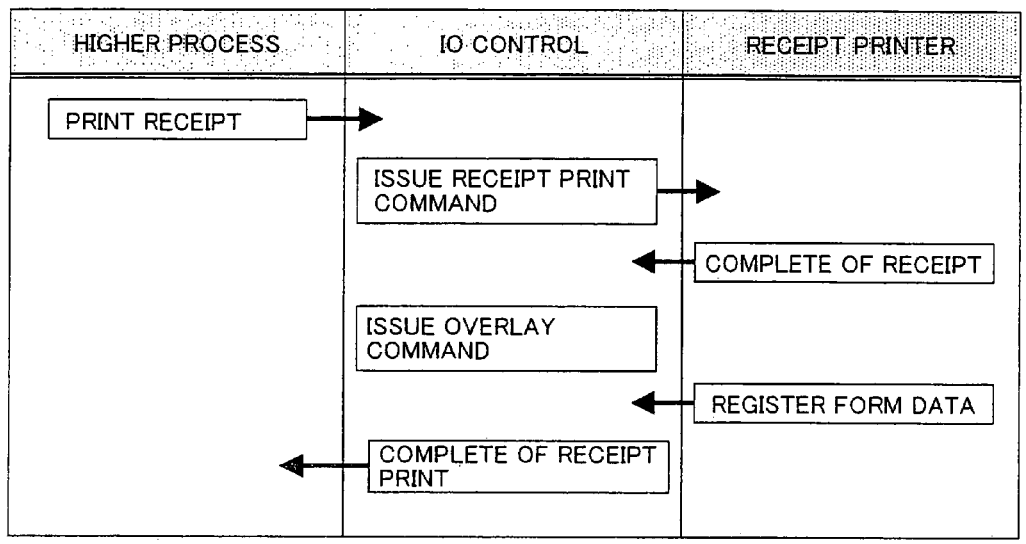
FIG. 32 is a diagram depicting the receipt printing operation.
Figure 33:
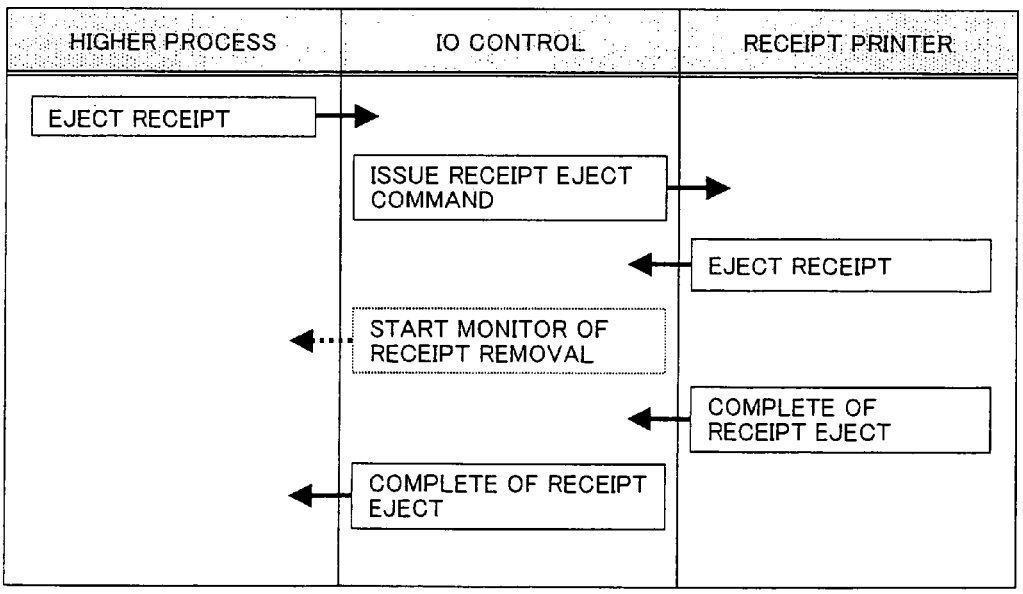
FIG. 33 is a diagram depicting the receipt ejection operation.

FIG. 26 is a table showing the vender specific parameters of the receipt printer unit command, FIG. 32 is a diagram depicting the receipt printing operation, and FIG. 33 is a diagram depicting the receipt ejection operation.

As FIG. 26 shows, as the vender specific parameters of the receipt printer (PPR), the initialization parameter and the receipt ejection parameter are provided.

The initialization parameter specifies the basic parameters required for the initialization processing operation of the RPR client. In other words, the initial values of the vender specific middleware are specified. The receipt ejection parameter specifies the parameters required for receipt ejection. For example, whether the line lamp is turned ON or not when the medium is ejected is specified.

FIG. 32 is a diagram depicting the operation of the RPR control library 174 and the receipt printer 20 when the receipt printing command is received. When the receipt printing command of the common API is received from the browser 120, which performs a higher process, the RPR control library 174 edits the vender specific parameters and the input parameters, just like the case of the above-mentioned FIG. 12, and issues the printing command to the receipt printer 20.

The receipt printer 20 sequentially prints on the receipt. When printing on the receipt completes, the receipt printer 20 notifies this to the library 174. Also the library 174 issues the overlay command, and causes the receipt printer 20 to perform overlay printing. When the receipt printer 20 ends the overlay printing, the library 174 notifies the completion of receipt printing to the browser 120. By this, the processing of the receipt printing command ends.

FIG. 33 is a diagram depicting the operation of the RPR control library 174 and the receipt printer 20 when the receipt ejection command is received. When the receipt ejection command of the common API is received from the browser 120, which performs a higher process, the RPR control library 174 edits the vender specific parameters and the input parameters, just like the case of the above mentioned FIG. 12, and issues the receipt ejection command to the receipt printer 20. The receipt printer 20 ejects the receipt to the exit, and notifies this to the library 174.

The library 174 notifies the receipt removal monitoring start to the browser 120, and the browser 120 starts removal wait timer monitoring. When the receipt removal is detected, the receipt printer 20 notifies the completion of removal to the library 174, and the library 174 notifies the completion of receipt ejection to the browser 120. By this, the processing of the receipt ejection command ends.

In this way, the vender specific parameters of the file are read by each control library, and the common API is converted into the vender specific API, so a conventional vender specific ATM middleware can be customized so as to operate with a standard API.

[Logicalization of Vender Specific Output]

When the above mentioned common API is converted into the vender specific API and the vender specific ATM middleware and I/O units are operated, the reply output of the vender specific I/O units can also be sent to the server 100 with the common API. A method of logicalizing the vender specific output will be described first, using the bill control library 175 of the bill unit 50.

Figure 34:
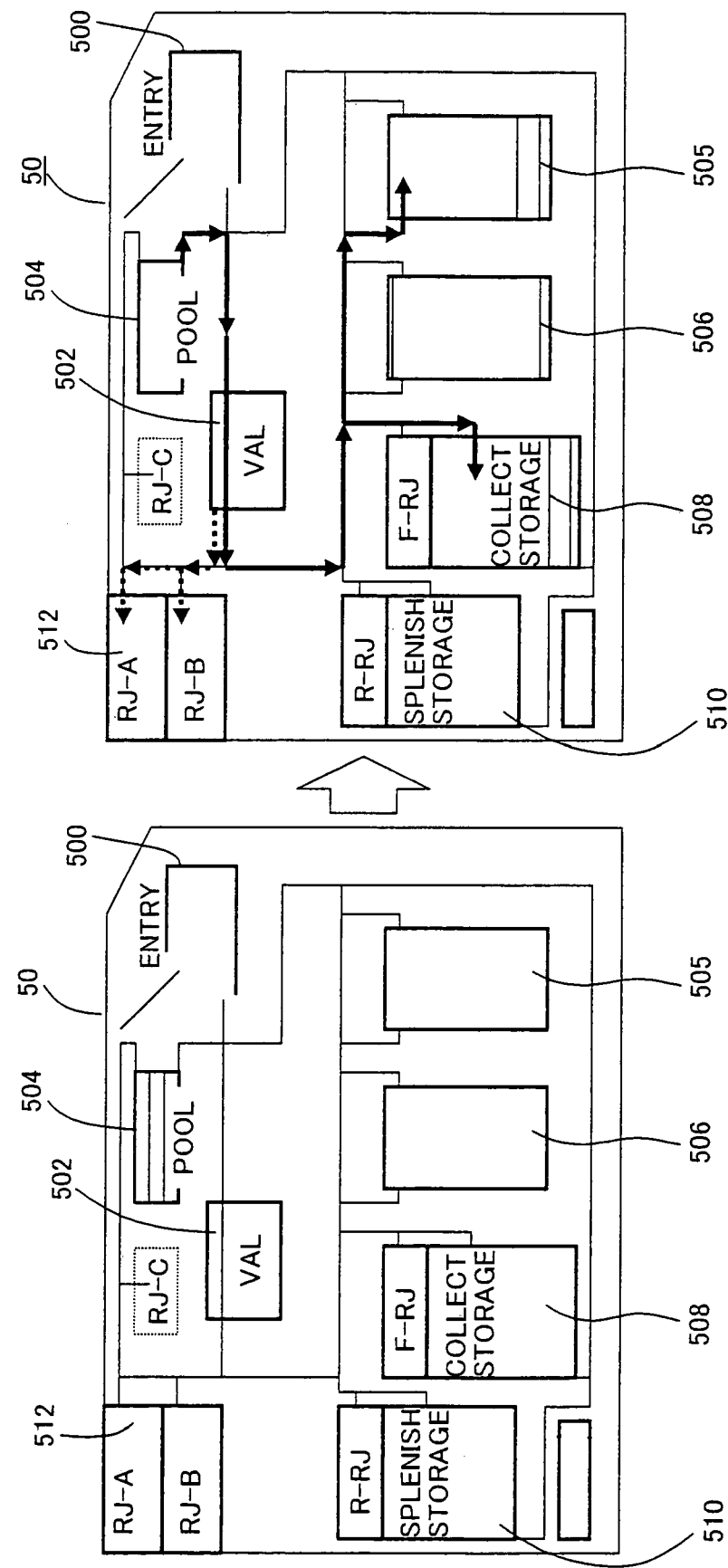
FIG. 34 is a diagram depicting the operation of the bill unit for describing the logicalization of the unit specific output of the present invention.
Figure 35:
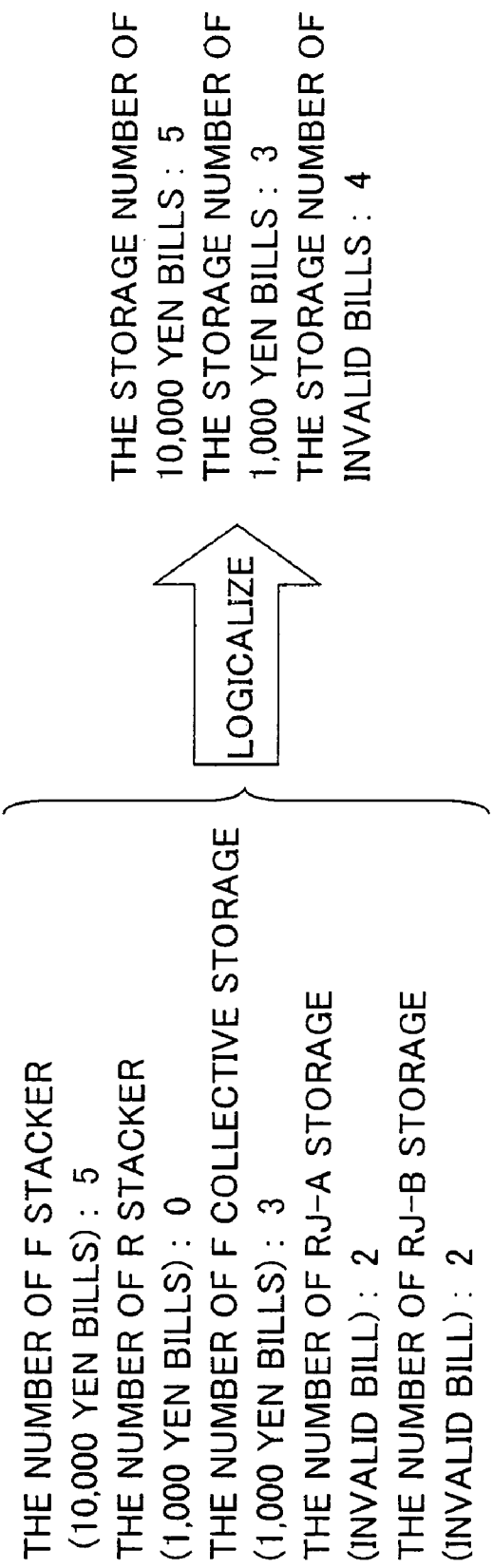
FIG. 35 is a diagram depicting the first embodiment of the logicalization processing of the unit specific output of the present invention.

FIG. 34 is a diagram depicting the deposit storing operation of the bill unit described in FIG. 19, and FIG. 35 is a diagram depicting the storing result reply processing of the bill control library 175 according to an embodiment of the present invention.

As FIG. 34 shows, in the deposit storing processing, the bills in the pool section 504 pass through the validation section 502, normal bills are stored in the stackers 505 and 506 and in the collected money storage 408, and abnormal bills are stored in the reject boxes 512 (A, B) separately.

As FIG. 35 shows, in this vender specific bill unit 50, the storing result has five types, the number of bills stored in the F (10,000 Yen bills) stacker 505, number of bills stored in the R (1000 Yen bills) stacker 506, number of bills stored in the collected money storage 508, and number of bills stored in the reject box 512 (A) and reject box 512 (B).

Here the bill control library 175 receives these five types of output from the bill unit 50, logicalizes them to three types, the number of 10,000 Yen bills stored (number of bills in stacker 505), number of 1000 Yen bills stored (total number of bills stored in the stacker 506 and number of bills stored in the collected money storage 508), and number of abnormal bills stored (total number of bills stored in the reject box 512 (A) and reject box 512 (B)). By this, the difference of the vender specific storage positions is absorbed, and the information can be commonly notified without consideration of the vender specific storage positions.

Figure 36:
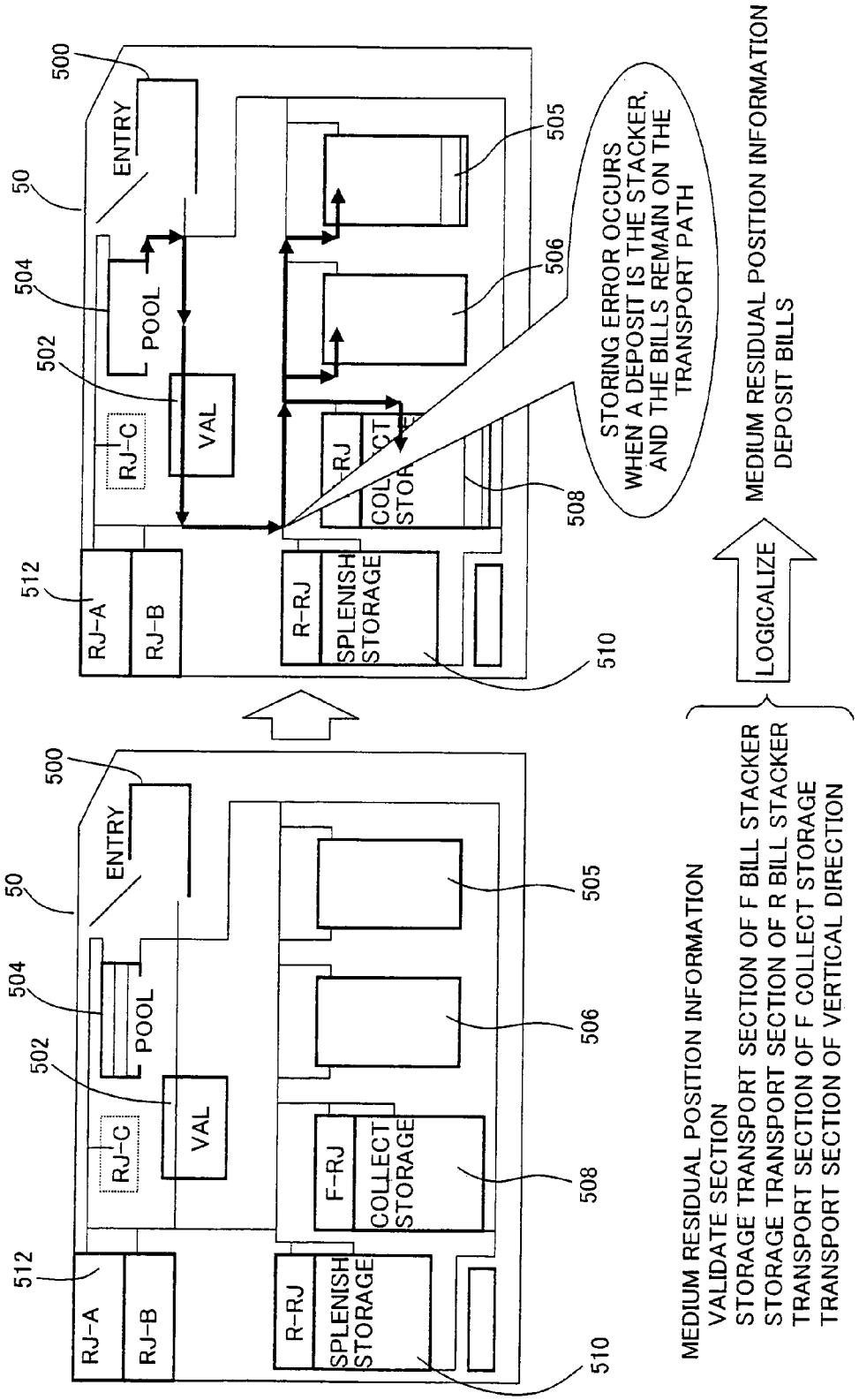
FIG. 36 is a diagram depicting the second embodiment of the logicalization processing of the unit specific output of the present invention.
Figure 37:
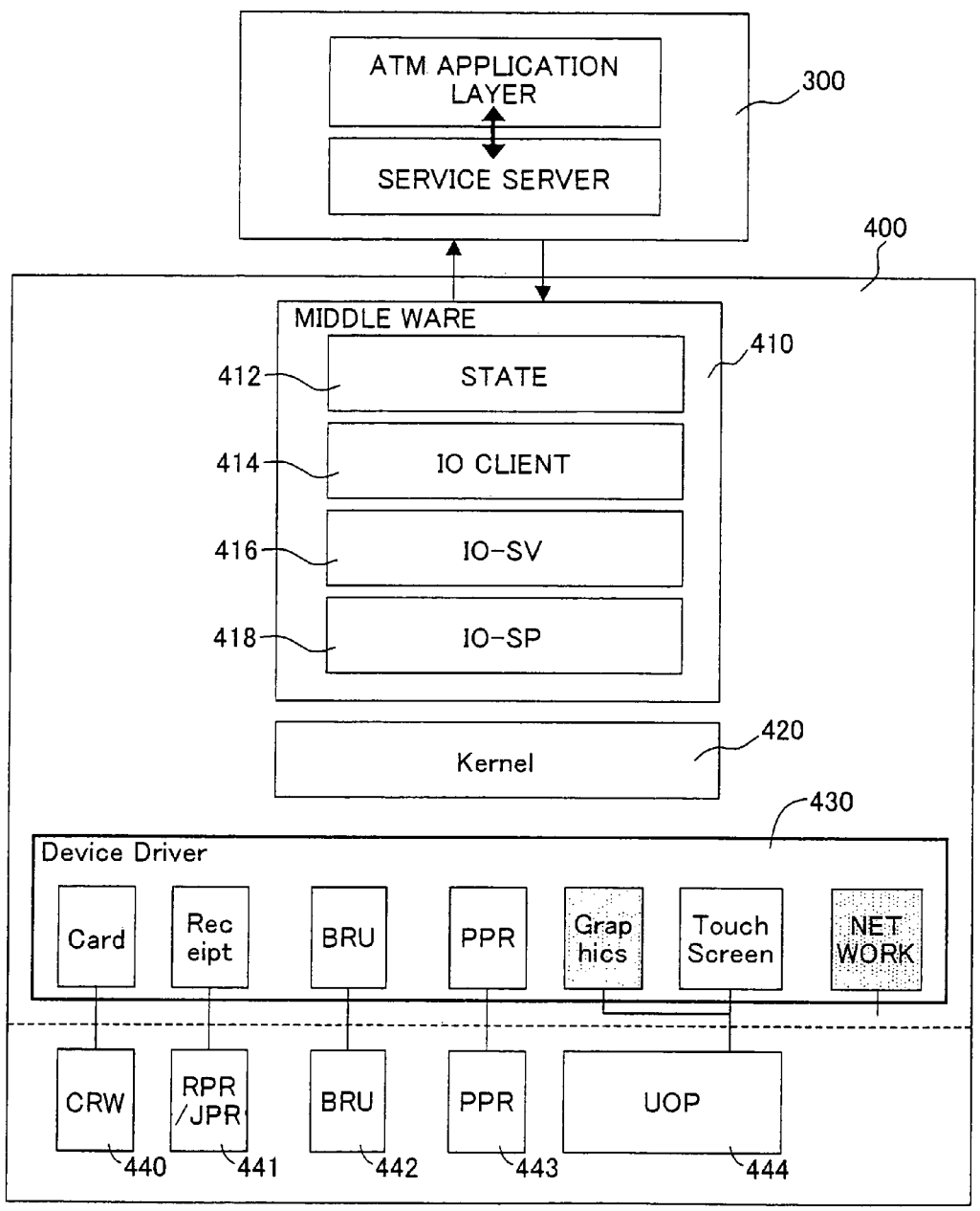
FIG. 37 is a diagram depicting a conventional automatic transaction system.

FIG. 36 is a diagram depicting the storing error processing when deposit is stored in the bill control library 175 according to another embodiment of the present invention. As FIG. 36 shows, a storing error occurs when a deposit is stored in the stacker in FIG. 19, and the bills remain on the transport path.

In this vender specific bill unit 50, the medium residual position information has five types, the validation section 502, storing transport section of the F (10,000 Yen bills) stacker 505, storage transport section of the R (1000 Yen bills) stacker 506, storing transport section of the collected money storage 508, and the vertical transport sections to the reject box 512 (A) and reject box 512 (B).

Here the bill control library 175 receives these five types of output from the bill unit 50, and logicalizes this to the deposited bills as logical medium residual information. By this, the difference of the vender specific residual positions is absorbed, and the information can be commonly notifies without consideration of the vender specific residual positions.

Here the case of bills was described, but logical output is possible in the same way for the library 176 of the coin unit 50, and logicalization of the medium residual positions can also be performed by the control libraries 171 and 172 of the card and passbook.

In this way, the vender specific output of the I/O units can be notified to the server 100 with a common API.

Other Embodiments

In the above embodiment, the automatic transaction apparatus shown in FIG. 1 was described as an example, but the present invention can be applied to other apparatus, such as a withdrawal machine, automatic issue machine, automatic vending machine and automatic cash loan machine.

The network was described using the Internet, but the present invention can also be applied to other networks, and the server can be applied not only for Web applications but for other applications as well.

The present invention was described using the embodiments, but the present invention can be modified in various ways within the scope of the essential character of the present invention, which shall not be excluded from the scope of the present invention.

According to the present invention, the vender specific parameters of the file are read and the common API is converted into the vender specific API, so a conventional vender specific ATM middleware can be customized so as to operate with a standard API. Therefore an automatic transaction system can be constructed utilizing the conventional assets of middleware and I/O units, and systems can be easily and quickly integrated.

What is claimed is:

1. An automatic transaction apparatus communicating with a host and performing a transaction operation according to an operation of a customer, comprising:
   a plurality of I/O units performing a financial transaction operation; and
   a control unit controlling one of said plurality of I/O units according to first common transaction control signals from said host, and
   wherein said control unit comprises:
      a middleware layer operating according to control of a kernel and controlling one of said plurality of I/O units,
      a parameter file storing parameters to convert said first common transaction control signals, which are common to each apparatus connected to said host and specified by an interface with said host, into second transaction control signals specific to said middleware layer, and
      an I/O control layer converting said first common transaction control signals into said second transaction control signals specific to said middleware layer by referring to said parameter file, and operating said middleware layer based on said second transaction control signals,
      and wherein said middleware layer specific to said automatic transaction apparatus controls said plurality of I/O units performing said financial transaction operation designated by said first common transaction control signals, according to said second transaction control signals,
   and wherein each of said of I/O units performing said financial transaction operation, comprises:
      a customer operation unit displaying a guidance screen for said customer and inputting a transaction item by said operating of said customer,
      a cash processing unit at least performing withdrawal of a cash; and
      a card reader and writer reading and writing data of a card inserted by said customer,
      wherein said I/O control layer converts said first common transaction control signals specific to said middleware layer by using said parameter file for instructing an operation of said customer operation unit, said cash processing unit, and said card reader and writer.

2. The automatic transaction apparatus according to claim 1, wherein:
   said I/O control layer further comprises a plurality of I/O control libraries corresponding to each of said plurality of I/O units; and
   said I/O control layer calls up one of said plurality of I/O control libraries according to said first common transaction control signals from said host, reads parameters corresponding to one of said plurality of I/O control libraries from said parameter file, edits said second transaction control signals specific to said middleware layer using the parameters, and operates said middleware layer.

3. The automatic transaction apparatus according to claim 1, wherein said middleware layer comprises:
   an I/O client layer intermediating third transaction control signals to one of said plurality of I/O units;
   an I/O server layer starting and ending an I/O operation and controlling the communication protocol by said third transaction control signals of said I/O client layer; and
   an I/O service provider layer converting messages with each of said plurality of I/O units.

4. The automatic transaction apparatus according to claim 1, wherein said plurality of I/O units implement cash transactions based on said operation of the customer.

5. The automatic transaction apparatus according to claim 1, wherein said I/O control layer receives said first common transaction control signals from said host which follow a cash transaction sequence specified by said customer, operates one of said plurality of I/O units, and returns a reply to said host.

6. The automatic transaction apparatus according to claim 1, wherein said control unit further comprises a browser communicating with said host on the Web and exchanging said first control signals specified by the interface between said I/O control layer and said host.

7. The automatic transaction apparatus according to claim 1, wherein said I/O control layer renders logical the reply from one of said plurality of I/O units and forwards it to said host.

8. The automatic transaction apparatus according to claim 7, wherein:
   one of said plurality of I/O units is an I/O unit handling a medium; and
   said I/O control layer renders logical the reply regarding said medium from said I/O unit, and forwards it to said host.

9. An automatic transaction control method of an automatic transaction apparatus communication with a host and performing a financial transaction operation according to an operation of a customer, comprising:
   receiving first common transaction control signals specified by an interface with said host;
   controlling a plurality of I/O units performing said financial transaction operation using a middleware layer based on said first transaction control signals; and
   referring to a parameter file storing parameters to convert said first common transaction control signals, which are common to each apparatus connected to said host and specified by the interface with said host, into second transaction control signals specific to said middleware layer, converting said first common transaction control signals sent from said host into said second transaction control signals specific to said middleware layer, and operating said middleware layer by said second transaction control signals,
   wherein said controlling comprises controlling said plurality of I/O units performing said financial transaction operation designated by said first common transaction control signals, by said middleware layer specific to said automatic transaction apparatus operated according to said second transaction control signals,
   and wherein said plurality of I/O units performing said financial transaction operation, comprises:
      a customer operation unit displaying a guidance screen for said customer and inputting a transaction item by said operating of said customer;
      a cash processing unit at least performing withdrawal of a cash; and
      a card reader and writer reading and writing data of a card inserted by said customer,
      wherein said converting comprises converting said first common transaction control signals specific to said middleware layer by using said parameter file for instructing an operation of said customer operation unit, said cash processing unit, and said card reader and writer.

10. The automatic transaction control method according to claim 9, wherein said operating step further comprises:
calling up an I/O control library from a plurality of I/O control libraries corresponding to each of said plurality of I/O units according to said first common transaction control signals from said host;
reading parameters corresponding to said I/O control library from said parameter file; and
editing said second transaction control signals specific to said middleware layer by using the parameters, and operating said middleware layer.

11. The automatic transaction control method according to claim 9, wherein said control step further comprises controlling one of said plurality of I/O units by said middleware layer having an I/O client layer to intermediate third transaction control signals to one of said plurality of I/O units, an I/O server layer starting and ending the I/O operation and controlling the communication protocol by said third transaction control signals of said I/O client layer, and an I/O service provider layer converting messages with each of said plurality of I/O units.

12. The automatic transaction control method according to claim 9, wherein said control step comprises controlling said plurality of I/O units to perform cash transactions based on said operation of the customer.

13. The automatic transaction control method according to claim 12, further comprising returning the operation result of one of said plurality of I/O units according to said first common transaction control signals from said host, which follow the cash transaction sequence specified by said customer, to said host as a reply.

14. The automatic transaction control method according to claim 9, wherein said receiving step comprises communicating with said host on the Web and exchanging said first common transaction control signals specified by the interface with said host.

15. The automatic transaction control method according to claim 9, further comprising rendering logical the reply from one of said plurality of I/O units, and forwarding it to said host.

16. The automatic transaction control method according to claim 15, wherein said reply from one of said plurality of I/O units comprises rendering logical the reply regarding said medium from one of said plurality of I/O units handling the medium, and forwarding it to said host.

17. A computer-readable medium storing a control program of an automatic transaction apparatus communicating with a host and performing a financial transaction operation according to an operation of a customer, and controlling said automatic transaction apparatus to perform:
receiving first common transaction control signals specified by an interface with said host;
referring to a parameter file which stores parameters converting said first common transaction control signals, which are common to each apparatus connected to said host and specified by the interface with said host, into second transaction control signals specific to a middleware layer to control a plurality of I/O units comprising a customer operation unit displaying a guidance screen for said customer and inputting a transaction item by said operating of said customer, a cash processing unit at least performing withdrawal of a cash and a card reader and writer reading and writing data of a card inserted by said customer, to perform said financial transaction operation, converting said first transaction control signals, sent from said host, into said second transaction control signals unique to said middleware layer, and operating said middleware layer; and
controlling said I/O units performing said financial transaction operation designated by said first common transaction control signals, by said middleware layer specific to said automatic transaction apparatus operated according to said second transaction control signals,
wherein said converting comprises converting said first common transaction control signals into said second transaction control signals specific to said middleware layer by using said parameter file for instructing an operation of said customer operation unit, said cash processing unit, and said card reader and writer.

18. The computer-readable medium according to claim 17, further controlling said automatic transaction apparatus to perform rendering logical the reply from one of said plurality of I/O units, and forwarding it to said host.

19. The automatic transaction apparatus according to claim 1, wherein said I/O control layer converts said first common transaction control signals comprised of first common commands for said financial transaction into said second transaction control signals comprised of second commands and parameters specific to said middleware.

20. The automatic transaction control method according to claim 9, wherein said converting comprises converting said first common transaction control signals comprised of first common commands for said financial transaction into said second transaction control signals comprised of second commands and parameters specific to said middleware.

* * * * *

UNITED STATES PATENT AND TRADEMARK OFFICE
CERTIFICATE OF CORRECTION

| | | |
|---|---|---|
| PATENT NO. | : 7,533,199 B2 | |
| APPLICATION NO. | : 10/830150 | |
| DATED | : May 12, 2009 | |
| INVENTOR(S) | : Shuichi Izawa et al. | |

It is certified that error appears in the above-identified patent and that said Letters Patent is hereby corrected as shown below:

Column 19, Line 36, after "of said" insert --plurality--.

Column 19, Line 40, change "customer," to --customer;--.

Signed and Sealed this

Twenty-ninth Day of September, 2009

David J. Kappos
*Director of the United States Patent and Trademark Office*